US011990683B2

(12) United States Patent
Mochizuki

(10) Patent No.: US 11,990,683 B2
(45) Date of Patent: May 21, 2024

(54) WIRELESS COMMUNICATION DEVICE AND WIRELESS COMMUNICATION METHOD

(71) Applicant: NEC Corporation, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 199 days.

(21) Appl. No.: 17/628,314

(22) PCT Filed: May 26, 2020

(86) PCT No.: PCT/JP2020/020714
§ 371 (c)(1),
(2) Date: Jan. 19, 2022

(87) PCT Pub. No.: WO2021/019885
PCT Pub. Date: Feb. 4, 2021

(65) Prior Publication Data
US 2022/0285853 A1 Sep. 8, 2022

(30) Foreign Application Priority Data

Jul. 31, 2019 (JP) ................................. 2019-141082

(51) Int. Cl.
*H01Q 21/06* (2006.01)
*H01Q 3/26* (2006.01)
*H04B 7/06* (2006.01)

(52) U.S. Cl.
CPC .............. *H01Q 21/06* (2013.01); *H01Q 3/26* (2013.01); *H04B 7/06* (2013.01)

(58) Field of Classification Search
CPC . H01Q 2/26; H01Q 21/06; H01Q 3/26; H04B 7/04; H04B 7/06
See application file for complete search history.

(56) References Cited

U.S. PATENT DOCUMENTS

| 7,215,298 B1 * | 5/2007 | Fraschilla | H01Q 1/08 342/368 |
| 8,208,963 B2 * | 6/2012 | Codreanu | H04B 17/21 455/562.1 |
| 2003/0142012 A1 * | 7/2003 | Hirabe | H01Q 3/267 342/174 |

(Continued)

FOREIGN PATENT DOCUMENTS

| EP | 1178562 A1 | 2/2002 |
| JP | 2006-279900 A | 10/2006 |

(Continued)

OTHER PUBLICATIONS

Partial Supplementary European Search Report for EP Application No. 20848545.8, dated Sep. 26, 2022.

(Continued)

*Primary Examiner* — Lam T Mai

(57) ABSTRACT

A wireless communication device (500) according to the present disclosure includes a plurality of antennas (520#n), a plurality of transmitter-receivers (TRX#n) that are provided in association with each of the plurality of antennas (520#n), and each include a transmitter (TX#n) and a receiver (RX#n), a calibration transmitter-receiver (CAL-TRX), a distribution synthesis unit (530), and a control unit (510). The control unit (510) causes a transmission calibration signal to be transmitted to each transmitter (TX#n) to be orthogonalized in frequency for each transmitter (TX#n). Each transmitter (TX#n) sends the transmission calibration signal being orthogonalized in frequency. The distribution synthesis unit (530) synthesizes the transmission calibration signals being transmitted from the transmitters (TX#n), and transmits the synthesized signal to the calibration transmitter-receiver (CAL-TRX).

10 Claims, 27 Drawing Sheets

(56) References Cited

U.S. PATENT DOCUMENTS

| | | | | |
|---|---|---|---|---|
| 2005/0047384 A1* | 3/2005 | Wax | .................... | H04W 72/046 |
| | | | | 455/561 |
| 2005/0239419 A1 | 10/2005 | Fudaba et al. | | |
| 2008/0129613 A1* | 6/2008 | Ermutlu | ................. | H01Q 3/267 |
| | | | | 343/703 |
| 2014/0354507 A1* | 12/2014 | Maca | ....................... | H01Q 3/26 |
| | | | | 343/853 |
| 2015/0138026 A1* | 5/2015 | Shay | ...................... | H04B 17/12 |
| | | | | 343/703 |
| 2018/0191545 A1 | 7/2018 | Liu et al. | | |
| 2021/0391879 A1* | 12/2021 | Mochizuki | ............... | H04B 1/04 |
| 2023/0143739 A1* | 5/2023 | Hwang | ................. | H01Q 21/22 |
| | | | | 343/702 |
| 2023/0170610 A1* | 6/2023 | Bories | ................... | H01Q 19/28 |
| | | | | 343/770 |
| 2023/0239060 A1* | 7/2023 | Jayasimha | .......... | H04L 27/2626 |
| | | | | 375/224 |
| 2023/0275347 A1* | 8/2023 | Lebron Garcia | ...... | H04B 17/11 |
| | | | | 343/702 |

FOREIGN PATENT DOCUMENTS

| | | | |
|---|---|---|---|
| JP | 2011-106858 A | | 6/2011 |
| JP | 2017-195463 A | | 10/2017 |
| JP | 2018-533252 A | | 11/2018 |
| WO | 2004/109952 A1 | | 12/2004 |

OTHER PUBLICATIONS

International Search Report for PCT Application No. PCT/JP2020/020714, dated Jul. 21, 2020.

* cited by examiner

WIRELESS COMMUNICATION DEVICE AND WIRELESS COMMUNICATION METHOD

This application is a National Stage Entry of PCT/JP2020/020714 filed on May 26, 2020, which claims priority from Japanese Patent Application 2019-141082 filed on Jul. 31, 2019, the contents of all of which are incorporated herein by reference, in their entirety.

TECHNICAL FIELD

The present disclosure relates to a wireless communication device and a wireless communication method.

BACKGROUND ART

One technique of achieving a large capacity of a wireless communication system is a multi user-multi input multi output (MU-MIMO), in which a base station performs communication with a plurality of terminals simultaneously by using a plurality of antennas.

When performing MU-MIMO, the base station performs beamforming of controlling a directivity of a beam emitted from the antenna. In beamforming, the directivity in a direction of a desired wave to an optional terminal among terminals that perform spatial multiplexing is increased, while a null is generated in a direction of another terminal, and an interference beam to the another terminal is suppressed.

Meanwhile, in recent years, it has been considered that an active antenna system (AAS) is used for a base station (for example, refer to Patent Literature 1). The AAS includes a plurality of antennas and a plurality of transmitter-receivers provided in association with each of the plurality of antennas. By using the AAS for the base station, it is possible to achieve and enhance beamforming performance including the spatial multiplexing, and it is possible to achieve high equivalent isotropic radiated power (EIRP) performance by integrating output power from a plurality of low-power transmitters. Thus, it is conceivable that the use of an AAS for a base station provides many advantages.

CITATION LIST

Patent Literature

[Patent Literature 1] Japanese Unexamined Patent Application Publication No. 2017-195463

SUMMARY OF INVENTION

Technical Problem

Incidentally, in the AAS, it is necessary to prevent degradation of a desired beamforming characteristic because amplitude and phase characteristics having variations for each transmitter-receiver are applied to the amplitude and phase weighted to a signal passing through each transmitter-receiver in order to form beamforming. Therefore, in the AAS, it is necessary to calibrate all of the transmitter-receivers and reduce or eliminate variations in amplitude and phase among the transmitter-receivers. In addition, the amplitude and phase specifications of each transmitter-receiver fluctuate due to fluctuations in outside air temperature and over time during operation, and the fluctuation also causes a difference in the amplitude and phase specifications between the transmitter-receivers. In order to compensate for the difference together, it is also important to perform sequential calibration periodically and remove the difference.

Herein, when transmission calibration being calibration of a transmitter in the transmitter-receiver is performed, each transmitter sends a transmission calibration signal.

However, when each transmitter uses transmission calibration signals of the same frequency arrangement composed of multi-tones, the transmission calibration signals may interfere with each other depending on a connection configuration of transmission paths of the transmission calibration signals.

Therefore, when each transmitter uses transmission calibration signals of the same frequency arrangement composed of multi-tones, in order to avoid interference between transmission calibration signals, transmission calibration of a plurality of transmitters cannot be performed collectively and simultaneously, and the transmission calibration has to be performed individually for each transmitter in a different time zone.

As a result, it takes time until all the transmission calibration of a plurality of transmitters are completed, and the amplitude and phase specifications of the transmitters fluctuate within that time, resulting in a problem that accuracy of the transmission calibration is deteriorated.

An object of the present disclosure is to provide a wireless communication device and a wireless communication method that are capable of solving the above-mentioned problem and maintaining high accuracy of transmission calibration.

Solution to Problem

A wireless communication device according to one aspect includes:
a plurality of antennas;
a plurality of transmitter-receivers that are provided in association with each of the plurality of antennas, and each include a transmitter and a receiver;
a calibration transmitter-receiver;
a distribution synthesis unit; and
a control unit, wherein
the control unit causes a transmission calibration signal to be sent to each transmitter to be orthogonalized in frequency for each transmitter,
each transmitter sends the transmission calibration signal being orthogonalized in frequency, and
the distribution synthesis unit synthesizes the transmission calibration signals being sent from transmitters and transmits the synthesized signal to the calibration transmitter-receiver.

A wireless communication method according to one aspect is a wireless communication method by a wireless communication device provided with:
a plurality of antennas;
a plurality of transmitter-receivers that are provided in association with each of the plurality of antennas, and each include a transmitter and a receiver;
a calibration transmitter-receiver; and
a distribution synthesis unit, the wireless communication method including:
a first step of causing a transmission calibration signal to be sent to each transmitter to be orthogonalized in frequency for each transmitter;

a second step of causing each transmitter to send the transmission calibration signal being orthogonalized in frequency; and a third step of causing the distribution synthesis unit to synthesize the transmission calibration signals being sent from transmitters and transmit the synthesized signal to the calibration transmitter-receiver.

Advantageous Effects of Invention

According to the above-described aspects, it is possible to attain an advantageous effect capable of providing a wireless communication device and a wireless communication method that are capable of maintaining high accuracy of transmission calibration.

DESCRIPTION OF EMBODIMENTS

Figure 1:
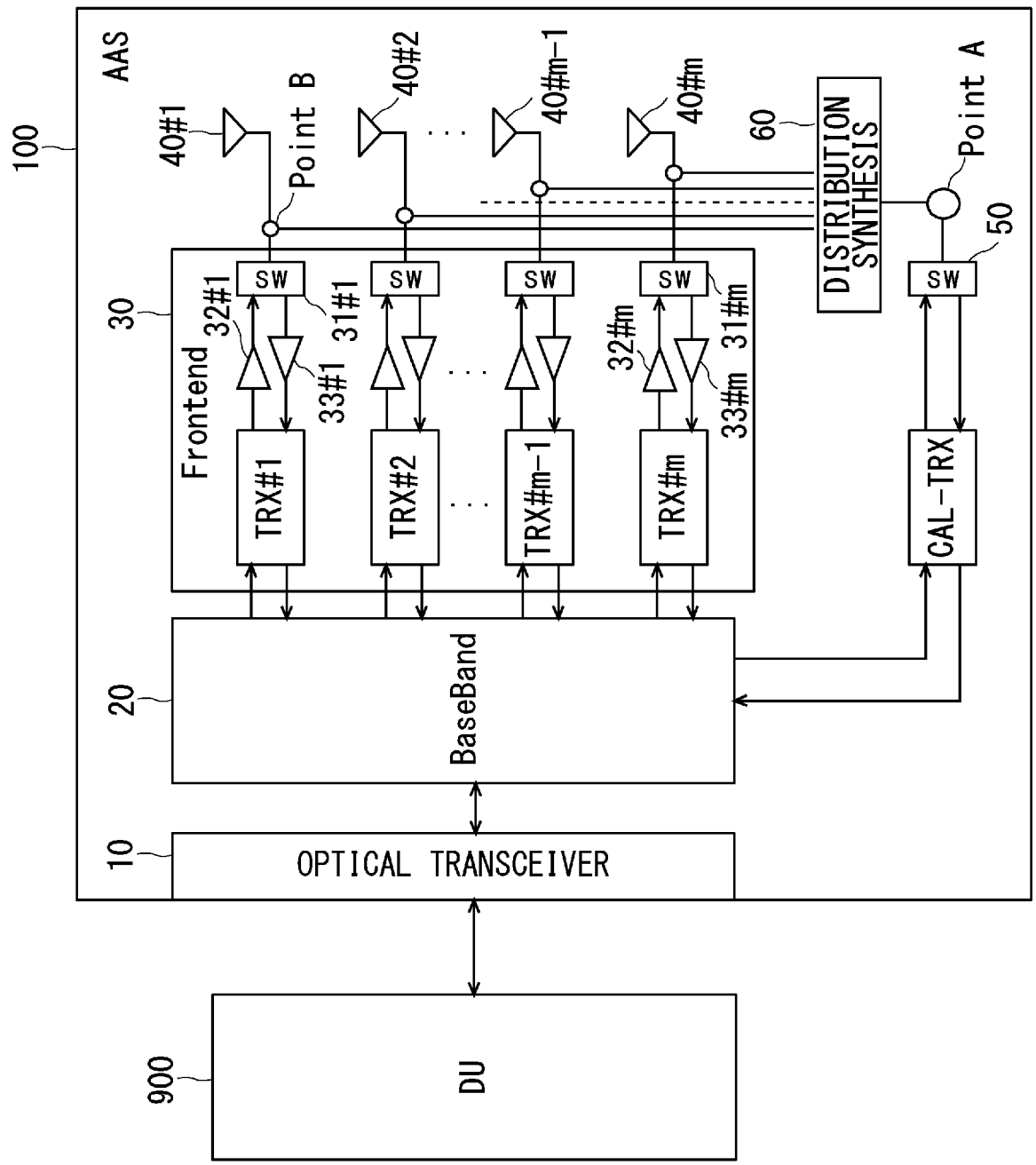
FIG. 1 is a circuit diagram illustrating a configuration example of an AAS according to a first example embodiment.

Example embodiments of the present disclosure will be described below with reference to the drawings. It is noted that the following description and the drawings are appropriately omitted and simplified for clarity of description. In the following drawings, the same elements are denoted by the same reference numerals, and a repetitive description thereof is omitted as necessary.

(1) First Example Embodiment

First, a configuration example of an AAS 100 according to a first example embodiment will be described with reference to FIG. 1. FIG. 1 is a circuit diagram illustrating a configuration example of the AAS 100 according to the first example embodiment. The AAS 100 according to the first example embodiment is an example of a wireless communication device.

As illustrated in FIG. 1, the AAS 100 according to the first example embodiment includes an optical transceiver 10, a baseband (BB) unit 20, a frontend unit 30, and a plurality (m, which is a natural number of 2 or more) of antennas 40#n (n=1, . . . , m), a calibration transmitter-receiver CAL-TRX, a switch (SW) 50, and a distribution synthesis unit 60. The frontend unit 30 includes a plurality (m) of transmitter-receivers TRX#n, switches (SW) 31#n, transmission amplifiers 32#n, and reception amplifiers 33#n, which are each associated to one of the plurality of antennas 40#n. The transmitter-receiver TRX#n includes a transmitter TX#n and a receiver RX#n, which are not illustrated. In FIG. 1, an input/output portion of the calibration transmitter-receiver CAL-TRX is represented by a point A, and the input/output portion of each transmitter-receiver TRX#n is represented by a point B.

The AAS 100 according to the first example embodiment is assumed to be used for a base station. Therefore, the AAS 100 performs DL calibration (sometimes referred to as "DL CAL" in the figure) that calculates a downlink (DL) calibration weight (sometimes referred to as "DL CAL Weight" in the figure) for compensating for variations in amplitude and phase characteristics of each transmitter TX#n as transmission calibration. The AAS 100 performs uplink (UL) calibration that calculates an uplink (UL) calibration weight for compensating for variations in amplitude and phase characteristics of each receiver RX#n as reception calibration.

The optical transceiver 10 performs photoelectric conversion of signals to be transmitted and received between a distributed unit (DU) 900 and the baseband unit 20, and vice versa.

When performing DL calibration, the baseband unit 20 outputs a DL calibration signal (IQ signal) to each transmitter-receiver TRX#n. When performing UL calibration, the baseband unit 20 outputs a UL calibration signal (IQ signal) to the calibration transmitter-receiver CAL-TRX. The baseband unit 20 is an example of a control unit.

As described above, the transmitter-receiver TRX#n includes a transmitter TX#n and a receiver RX#n, which are not illustrated. When performing the DL calibration, the transmitter TX#n converts the DL calibration signal being output from the baseband unit 20 from an IQ signal to an RF signal, and sends the signal to a transmission amplifier 32#n. When performing UL calibration, the receiver RX#n converts the UL calibration signal being output from a reception amplifier 33#n from an RF signal to an IQ signal, and sends the converted signal to the baseband unit 20.

When performing DL calibration, the transmission amplifier 32#n amplifies the DL calibration signal being output from the transmitter TX#n and outputs the amplified DL calibration signal to the switch 31#n. When performing UL calibration, the reception amplifier 33#n amplifies the UL calibration signal being output from the switch 31#n and outputs the amplified UL calibration signal to the receiver RX#n.

The switch 31#n is a switch that switches a connection between the antenna 40#n and the transmitter TX#n or the receiver RX#n, and time division duplex (TDD) is assumed as a communication method in the first example embodiment. When performing DL calibration, the switch 31#n outputs the DL calibration signal being output from the transmission amplifier 32#n to the distribution synthesis unit 60. When performing UL calibration, the switch 31#n outputs the UL calibration signal being output from the distribution synthesis unit 60 to the reception amplifier 33#n.

When performing DL calibration, the distribution synthesis unit 60 synthesizes the DL calibration signals being output from the switches 31#n and outputs the synthesized DL calibration signal to the switch 50. When performing UL calibration, the distribution synthesis unit 60 distributes the UL calibration signal being output from the switch 50 and outputs the distributed UL calibration signal to each of the switches 31#n.

The switch 50 is a switch that switches directions of DL and UL calibration between the calibration transmitter-receiver CAL-TRX and each transmitter-receiver TRX#n. When performing DL calibration, the switch 50 outputs the DL calibration signal being output from the distribution synthesis unit 60 to the calibration transmitter-receiver CAL-TRX. When performing UL calibration, the switch 50 outputs the UL calibration signal being output from the calibration transmitter-receiver CAL-TRX to the distribution synthesis unit 60.

The calibration transmitter-receiver CAL-TRX includes a calibration transmitter CAL-TX and a calibration receiver CAL-RX, which are not illustrated. When performing DL calibration, the calibration receiver CAL-RX converts the DL calibration signal being output from the switch 50 from an RF signal to an IQ signal, and sends the converted signal to the baseband unit 20. When performing UL calibration, the calibration transmitter CAL-TX converts the UL calibration signal being output from the baseband unit 20 from an IQ signal to an RF signal, and sends the converted signal to the switch 50.

When performing DL calibration, the baseband unit 20 calculates a DL calibration weight of each transmitter TX#n, based on the DL calibration signal sent from the calibration receiver CAL-RX. When performing UL calibration, the baseband unit 20 calculates an UL calibration weight of each receiver RX#n, based on the UL calibration signal sent from each receiver RX#n.

At a time of a DL operation of transmitting a BF signal to a terminal that is not illustrated, a BF signal (IQ signal) being output from the distribution unit 900 is input to the baseband unit 20 via the optical transceiver 10. The baseband unit 20 corrects the BF signal by using the DL calibration weight of each transmitter TX#n, and outputs the corrected BF signal to each transmitter TX#n. Thereafter, the BF signal is converted from the IQ signal to the RF signal by each transmitter TX#n and is sent out, amplified by each transmission amplifier 32#n, and transmitted from each antenna 40#n to a terminal that is not illustrated.

At a time of a UL operation in which a UL signal is received from a terminal that is not illustrated, a UL signal (RF signal) from the terminal that is not illustrated is received by each of the antennas 40#n, amplified by each of the reception amplifiers 33#n, converted from an RF signal to an IQ signal by each receiver RX#n, sent out, and input to the baseband unit 20. The baseband unit 20 corrects the UL signal from each receiver RX#n by using the UL calibration weight of each receiver RX#n, and outputs the corrected UL signal to the distribution unit 900 via the optical transceiver 10.

An outline operation of the AAS 100 according to the first example embodiment will be described below. Since the present disclosure aims to solve the problem related to DL calibration (transmission calibration), only an operation of the DL calibration and the DL operation will be described in detail below.

Figure 2:
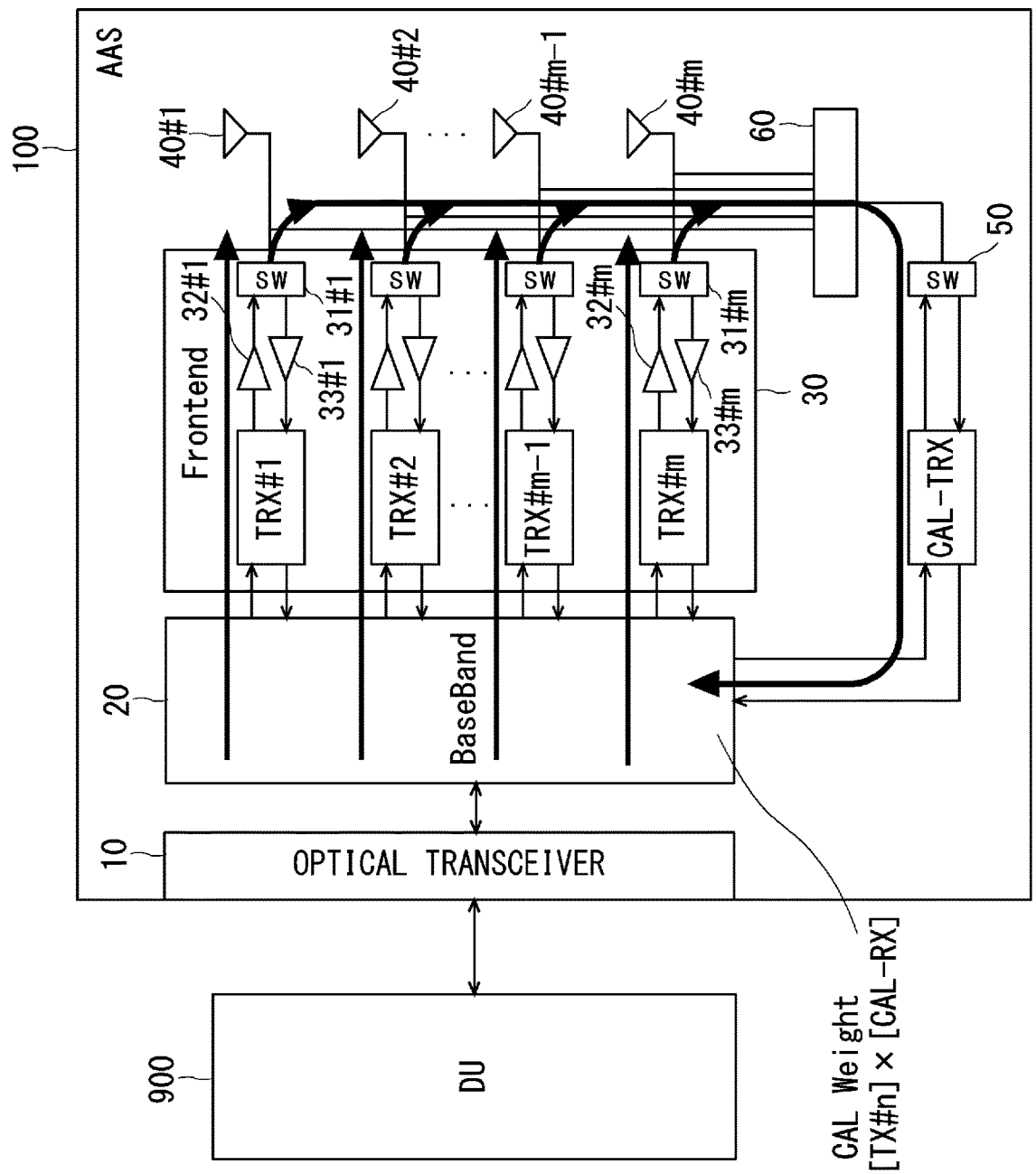
FIG. 2 is a diagram explaining an operation example of a DL calibration operation of the AAS according to the first example embodiment.

First, an operation example of the DL calibration operation of the AAS 100 according to the first example embodiment will be described with reference to FIG. 2. FIG. 2 is a diagram explaining an operation example of the DL calibration operation of the AAS 100 according to the first example embodiment.

As illustrated in FIG. 2, the baseband unit 20 outputs a DL calibration signal (IQ signal) to each transmitter TX#n. Each transmitter TX#n converts the DL calibration signal from an IQ signal to an RF signal and sends it out. The DL calibration signal sent from each transmitter TX#n is output to the distribution synthesis unit 60 via the transmission amplifier 32#n and the switch 31#n, and is synthesized by the distribution synthesis unit 60. The DL calibration signal synthesized by the distribution synthesis unit 60 is transmitted to the calibration transmitter-receiver CAL-TRX via the switch 50.

The calibration transmitter-receiver CAL-TRX converts the DL calibration signal transmitted from the distribution synthesis unit 60 from an RF signal to an IQ signal, and sends the signal to the baseband unit 20.

The DL calibration signal sent from the calibration transmitter-receiver CAL-TRX is in a state in which the DL calibration signal sent from each transmitter TX#n is synthesized by frequency multiplexing. Therefore, the baseband unit 20 frequency-separates the DL calibration signal sent from the calibration transmitter-receiver CAL-TRX by fast Fourier transform (FFT), extracts the DL calibration signal for each transmitter TX#n, and calculates a DL calibration weight.

Herein, the DL calibration weight of the transmitter TX#n is multiplied by transmission system characteristics (amplitude and phase characteristics) [TX#n] of the transmitter TX#n and reception system characteristics (amplitude and phase characteristics) [CAL-RX] of the calibration receiver CAL-RX, as expressed by the following equation 1.

DL CALIBRATION WEIGHT=[TX#n]×[CAL–RX] [Equation 1]

Figure 3:
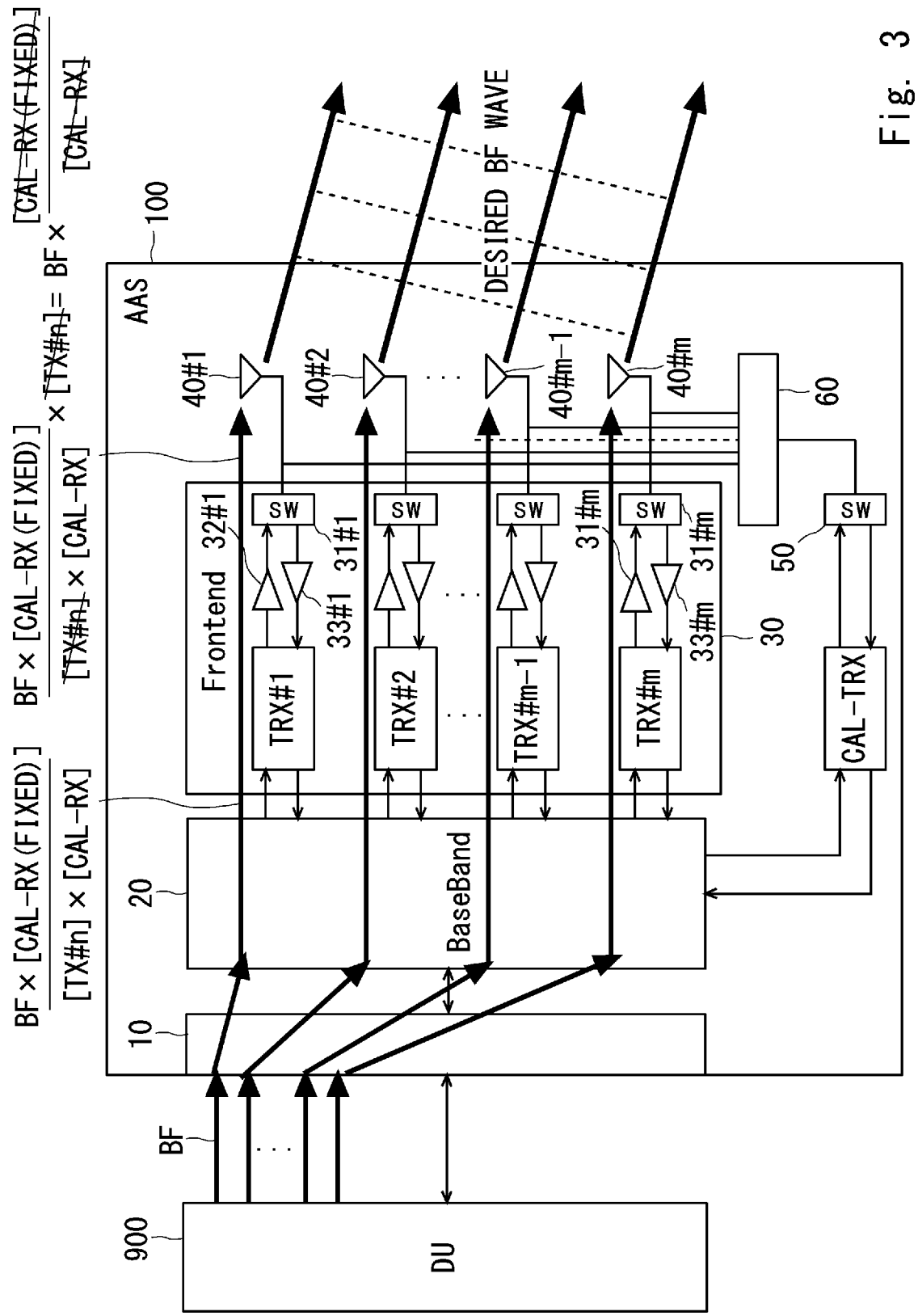
FIG. 3 is a diagram explaining an operation example of a DL operation of the AAS according to the first example embodiment.

Next, an operation example of the DL operation of the AAS 100 according to the first example embodiment will be described with reference to FIG. 3. FIG. 3 is a diagram explaining an operation example of the DL operation of the AAS 100 according to the first example embodiment.

As illustrated in FIG. 3, the BF signal (IQ signal) being output from the distribution unit 900 is input to the baseband unit 20 via the optical transceiver 10. The baseband unit 20 corrects the BF signal by using the DL calibration weights of the transmitters TX#n. Specifically, the baseband unit 20 multiplies the BF signal by a fraction having a DL calibration weight as a denominator and a fixed reception system characteristic [CAL-RX (fixed)] of the calibration receiver CAL-RX as a numerator. The corrected BF signal can be expressed as in the following Equation 2. It is noted that [CAL-RX (fixed)] is stored in advance in the baseband unit 20.

$$BF \times \frac{[CAL - RX(\text{FIXED})]}{[TX\#n] \times [CAL - RX]}$$ [Equation 2]

The corrected BF signal being corrected by the baseband unit 20 is converted from the IQ signal to the RF signal by each transmitter TX#n and sent, amplified by each transmission amplifier 32#n, and output from the frontend unit 30. Since the BF signal being output from the frontend unit 30 passes through each transmitter TX#n, the BF signal can be expressed as in the following Equation 3.

$$BF \times \frac{[CAL - RX(\text{FIXED})]}{[TX\#n] \times [CAL - RX]} \times [TX\#n]$$ [Equation 3]

Equation 3 can be expressed as in Equation 4 below when [TX#n] is deleted.

$$BF \times \frac{[CAL - RX(\text{FIXED})]}{[CAL - RX]}$$ [Equation 4]

In Equation 4, when [CAL-RX (fixed)]=[CAL-RX], the BF signal is in an ideal state, and the BF signal in the ideal state is transmitted from each antenna 40#n.

By executing the operations of FIGS. 2 and 3, it is possible to compensate for variations in amplitude and phase specifications of each transmitter TX#n.

Figure 4:
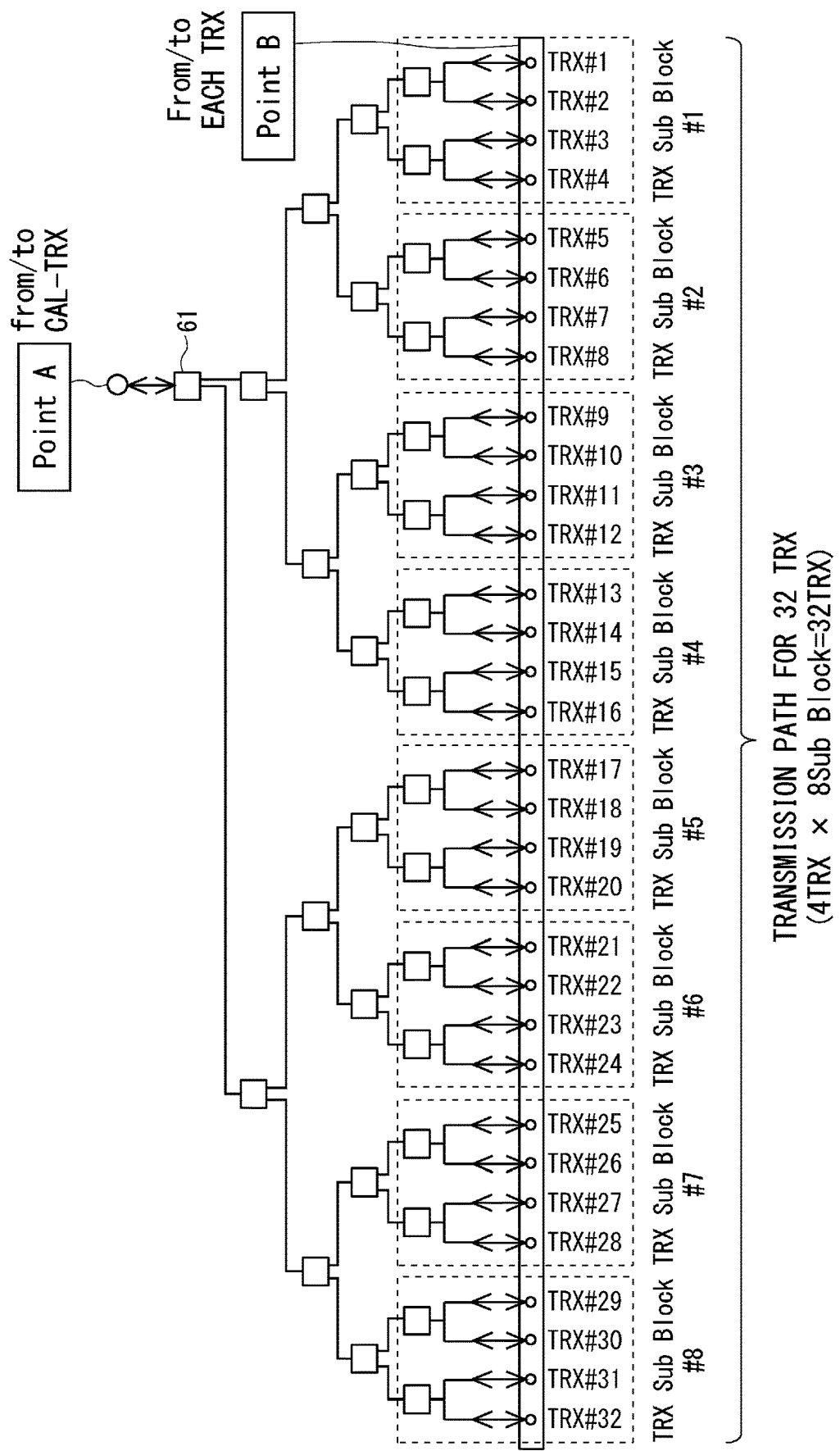
FIG. 4 is a diagram illustrating a connection configuration example of the entire transmission path from a point A to each point B in FIG. 1 in the AAS according to the first example embodiment.
Figure 5:
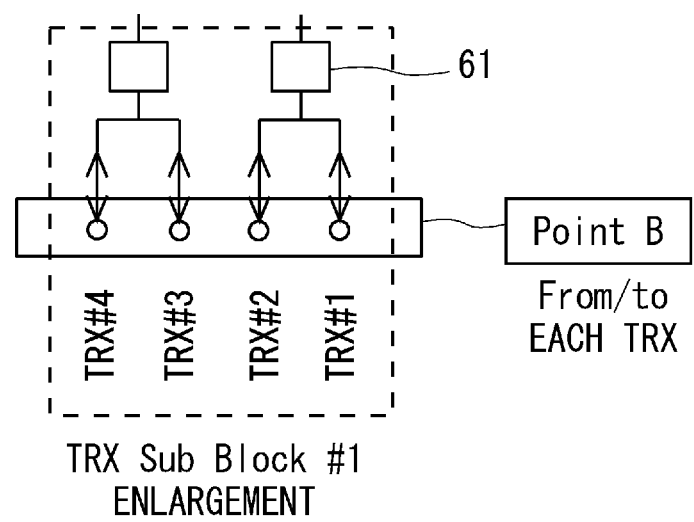
FIG. 5 is a diagram illustrating an example of an enlarged configuration of a TRX sub-block #1 in FIG. 4.

Herein, with reference to FIGS. 4 and 5, a connection configuration example of a transmission path from the point A to each point B in FIG. 1 in a case where 32 transmitter-receivers TRX#n are provided (i.e., in a case where m=32). FIG. 4 illustrates a connection configuration example of the entire transmission path from the point A to each point B, and FIG. 5 illustrates an enlarged configuration example of a TRX sub-block #1 of FIG. 4.

As illustrated in FIGS. 4 and 5, the distribution synthesis unit 60 arranged in the transmission path from the point A to each point B is composed of a plurality of distribution synthesizer 61 connected in a tournament mode. In addition, the uppermost stage of the tournament is the point A, and the lowermost stage is each point B.

By adopting the transmission path as illustrated in FIGS. 4 and 5, when the UL calibration is performed, the UL calibration signals can be transmitted from the calibration transmitter-receiver CAL-TRX to each receiver RX#n collectively and simultaneously. When the DL calibration is performed, the DL calibration signals can be transmitted from each transmitter TX#n to the calibration transmitter-receiver CAL-TRX collectively and simultaneously.

Herein, in the UL calibration, even when the UL calibration signals are collectively and simultaneously transmitted from the calibration transmitter-receiver CAL-TRX to each receiver RX#n, there is no possibility that the UL calibration signals interfere with each other.

On the other hand, in the DL calibration, when DL calibration signals are transmitted from the transmitters TX#n to the calibration transmitter-receiver CAL-TRX, the DL calibration signals sent from the transmitters TX#n are synthesized by the distribution synthesis unit 60. Therefore, when each transmitter TX#n uses DL calibration signals having the same frequency arrangement composed of multi-tones, the DL calibration signals interfere with each other. In order to avoid such interference between the DL calibration signals, it is also conceivable to individually perform DL calibration for each transmitter TX#n in a different time zone. However, when the DL calibration is performed individually for each transmitter TX#n, it takes time to complete the DL calibration of each transmitter TX#n. As a result, the amplitude and phase specifications of each transmitter TX#n fluctuate within that time, and thus accuracy of DL calibration deteriorates.

In addition, when the AAS 100 performs DL calibration under the Fifth Generation (5G) New Radio (NR) standard established by the Third Generation Partnership Project (3GPP), it is necessary to perform the DL calibration at a very short free time at the head or the tail of a UL symbol or a DL symbol.

Figure 6:
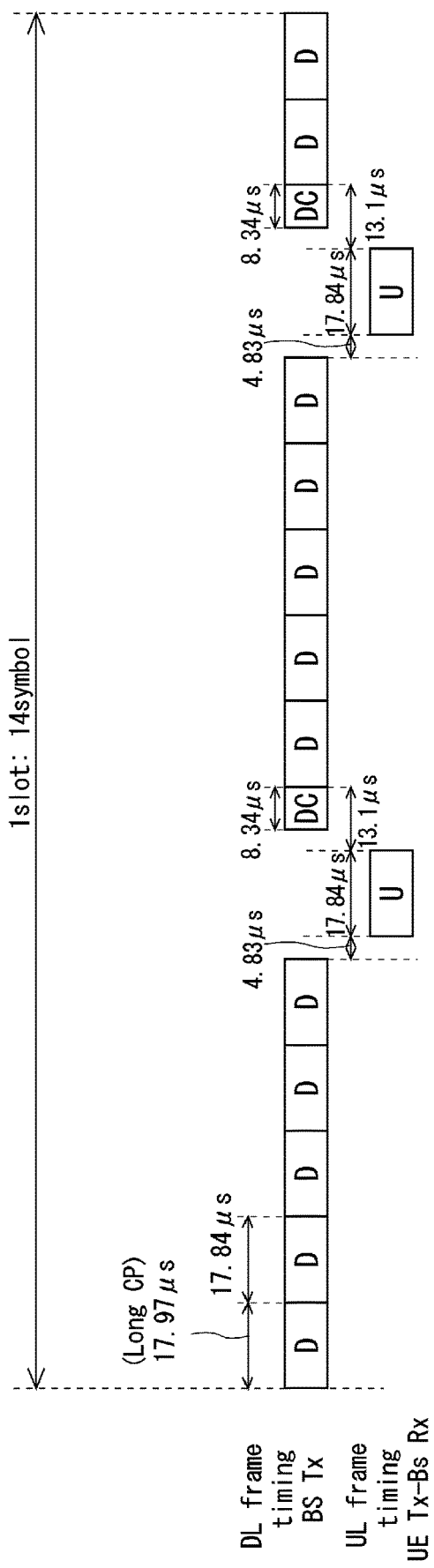
FIG. 6 is a diagram explaining an example of timing at which the AAS according to the first example embodiment performs DL calibration.

Herein, with reference to FIG. 6, a description will be given of an example of a timing at which the AAS 100 performs DL calibration under the Dynamic TDD (DL/UL is switched for each symbol) which can configure the fastest and flexible inter-terminal transmission/reception among the TDD systems of the 5G NR standard. FIG. 6 is a diagram explaining an example of a timing at which the AAS 100 performs DL calibration under the 5G NR standard. In FIG. 6, it is assumed that an interval between subcarriers (SC) is 60 [kHz], one sub-frame is composed of 4 slots, one slot is composed of 14 symbols, and a symbol length of a portion excluding a cyclic prefix of one symbol is 16.7 [µsec].

In the example of FIG. 6, a very short free time (denoted as "DC" in the drawing) of 8.34 [µsec] at the head of the DL symbol (denoted as "D" in the drawing) is allocated as a time for executing the DL calibration (i.e., a time for executing the DL calibration operation of FIG. 2 described above). It is noted that the DL operation in FIG. 3 described above is executed at the time when the DL symbol is allocated. In addition, the UL operation is executed at a time when the UL symbol (denoted as "U" in the figure) is allocated.

As described above, when the DL calibration is individually performed for each transmitter TX#n, it takes time to terminate the DL calibration. Therefore, an amplitude phase state of the transmitter TX#1 for which the DL calibration correction value is acquired at the beginning of a calibration cycle may change at a time when derivation of the DL calibration correction value of the last transmitter TX#m is terminated. In this case, since a deviation occurs in the amplitude phase after performing the calibration of the transmitter TX#1 at the beginning of the same cycle, a problem arises that a residual amplitude phase error after the DL calibration of all the transmitters TX#1 to TX#m deteriorates. Also, under the 5G NR standard, it is necessary to perform DL calibration in a very short time, and therefore it is required to instantaneously complete DL calibration between all the transmitters TX#1 to TX#m.

Therefore, it is important to perform the DL calibration of each transmitter TX#n collectively and simultaneously as in the case of the UL calibration. However, for this purpose, even when the DL calibration signals are transmitted from the transmitters TX#n to the calibration transmitter-receiver CAL-TRX collectively and simultaneously, it is necessary to take measures such that the DL calibration signals do not mix and interfere with each other on a frequency axis.

Therefore, in the first example embodiment, the baseband unit 20 causes the DL calibration signal composed of multi-tones, which is sent from each transmitter TX#n, to be orthogonalized in frequency for each transmitter TX#n.

Hereinafter, examples of a frequency arrangement of the DL calibration signal that is orthogonalized in frequency for each transmitter TX#n will be described. Herein, an example of the frequency arrangement of the DL calibration signal for each transmitter TX#n in a case where 32 transmitter-receivers TRX#n are provided (i.e., in the case where m=32) will be described.

(A) First Example

Figure 7:
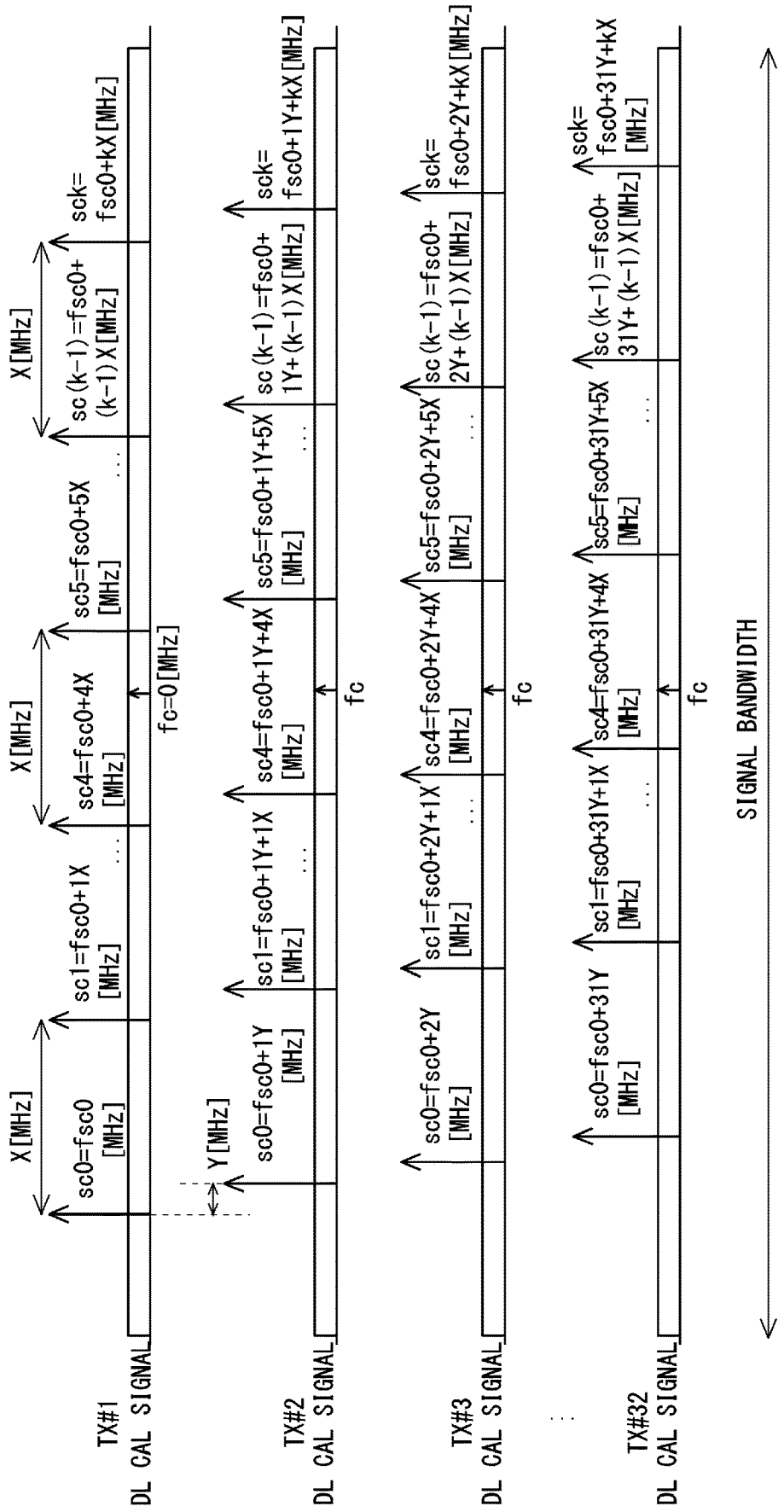
FIG. 7 is a diagram explaining a first example of a frequency arrangement of DL calibration signals for each transmitter according to the first example embodiment.

First, a first example of the frequency arrangement of the DL calibration signal for each transmitter TX#n will be described with reference to FIG. 7. FIG. 7 is a diagram explaining a first example of the frequency arrangement of the DL calibration signal for each transmitter TX#n.

In the first example illustrated in FIG. 7, in the frequency arrangement of the DL calibration signal of one transmitter TX#n, subcarriers used for sending out the DL calibration signal are arranged at intervals of X [MHz]. In the adjacent transmitters TX#n, the frequency arrangements of the DL calibration signals are caused to shift by Y [MHz] in a frequency direction. It is noted that fs0 [MHz] is a reference frequency.

Herein, in the first example illustrated in FIG. 7, it is necessary to satisfy the following two frequency arrangement conditions A1 and A2.

Frequency Arrangement Condition A1:

X [MHz]>Y [MHz] x (number of transmitters TX#n−1) is established.

Frequency Arrangement Condition A2:

A frequency "sc0=fs0 [MHz]" of the lowest limit subcarrier sc0 of the DL calibration signal for the transmitter TX#1 to a frequency "sck=fsc0+31Y+kX [MHz]" of the highest limit subcarrier sck of the DL calibration signal for the transmitter TX#32 fall within a signal bandwidth range.

(B) Second Example

In the first example described above, in the adjacent transmitters TX#n, the frequency arrangements of the DL calibration signals are caused to shift by Y [MHz] in the frequency direction.

Figure 8:
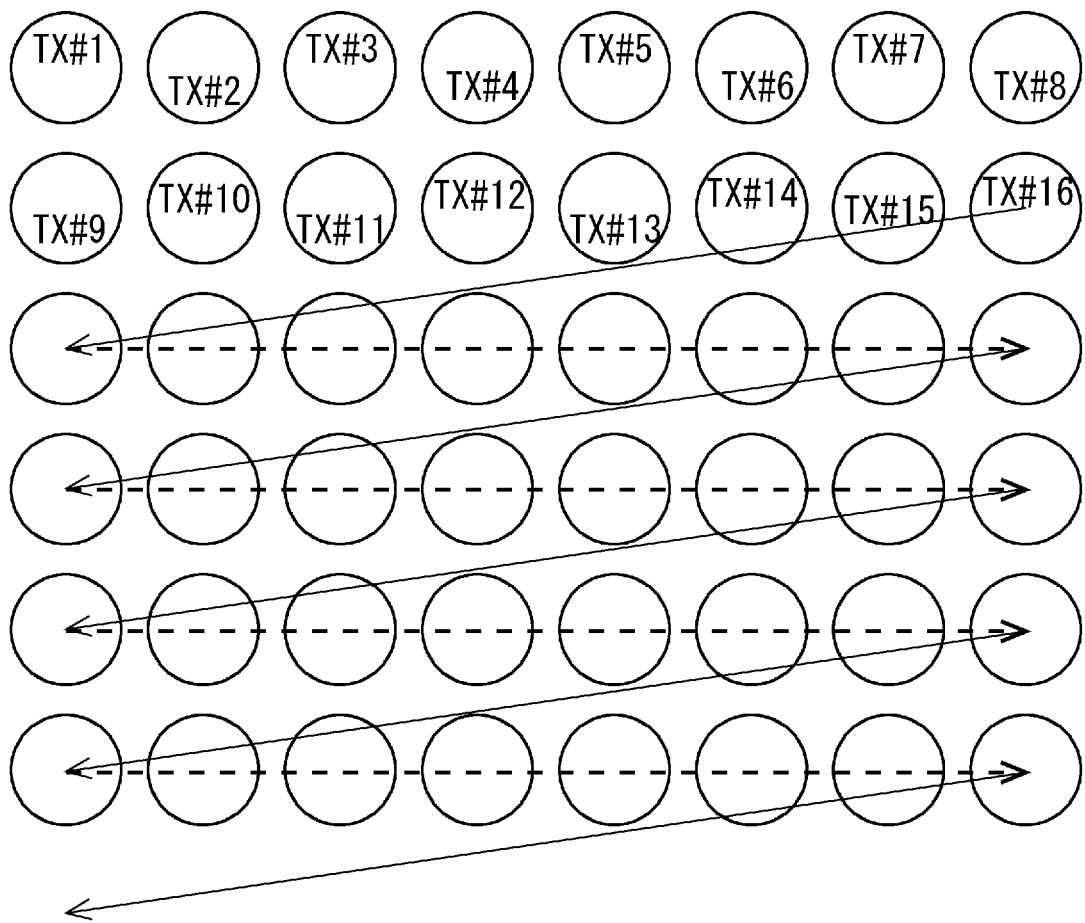
FIG. 8 is a diagram illustrating an arrangement example of a transmitter/antenna in the AAS according to the first example embodiment.

However, for example, as illustrated in FIG. 8, when the physical interval between the adjacent transmitters TX#n/antennas 40#n is narrow, an influence of mutual coupling between the adjacent transmitters TX#n/antennas 40#n may not be negligible.

Therefore, in the second example, in the adjacent transmitters TX#n, the frequency arrangements of the DL calibration signals are caused to shift in such a way as to deviate by Y [MHz] or more.

Figure 9:
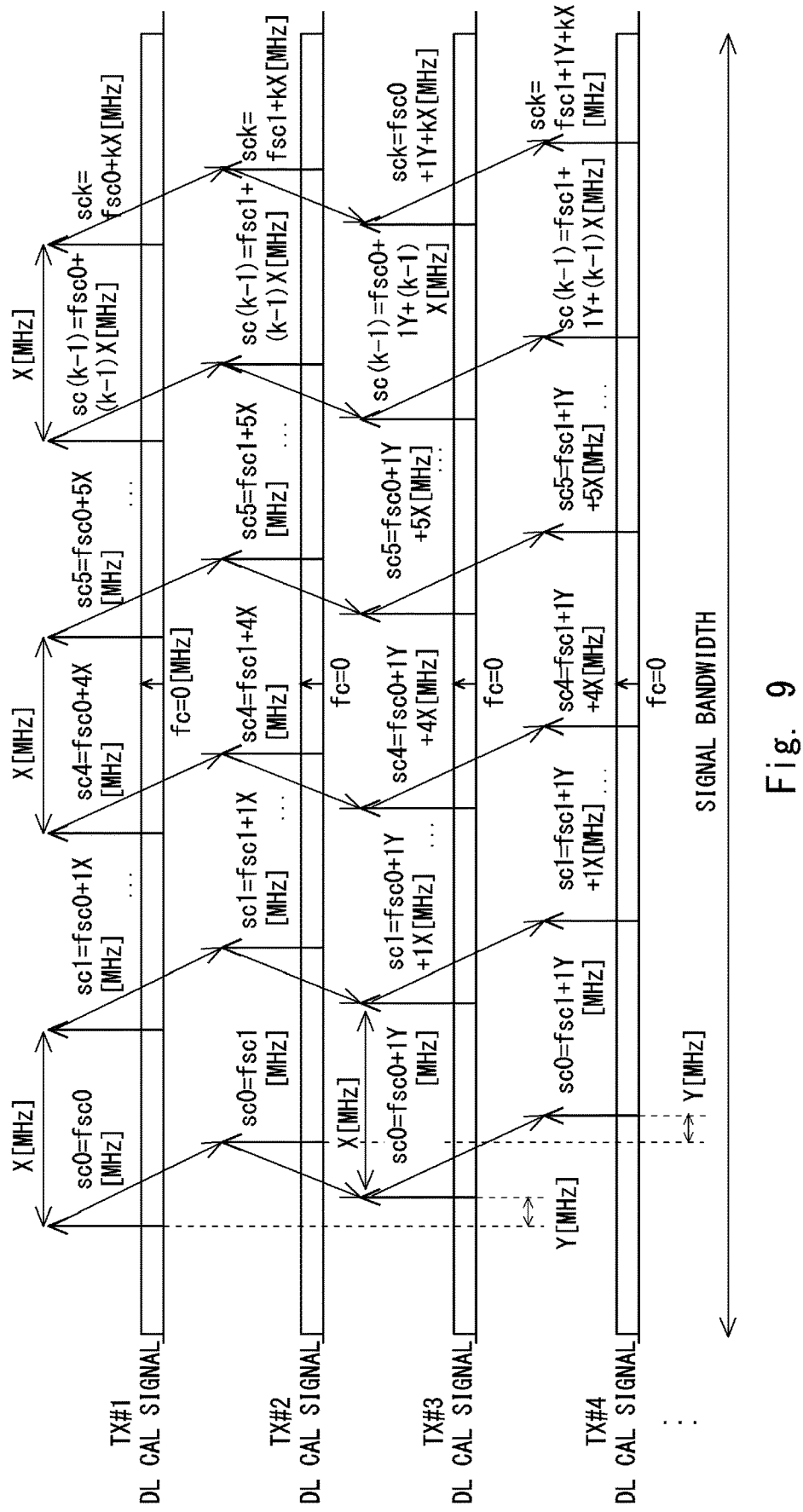
FIG. 9 is a diagram explaining a second example of the frequency arrangement of DL calibration signals for each transmitter according to the first example embodiment.
Figure 10:
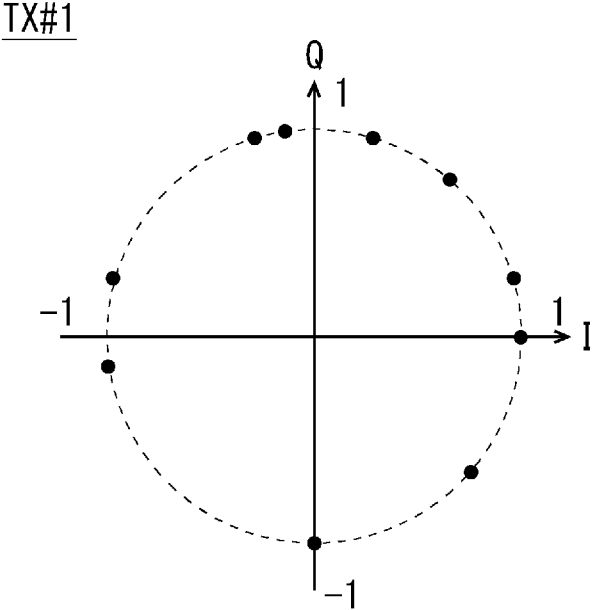
FIG. 10 is a diagram explaining an example of a constellation of a DL calibration signal subjected to phase modulation by a Zadoff-Chu sequence in an AAS according to a second example embodiment.
Figure 11:
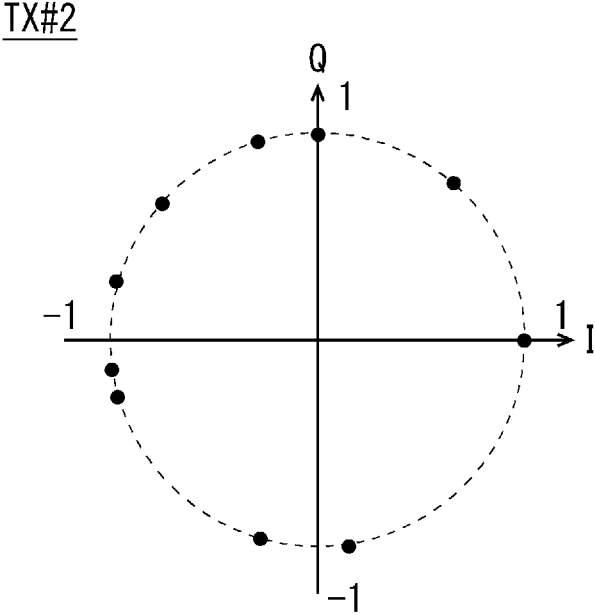
FIG. 11 is a diagram explaining an example of a constellation of a DL calibration signal subjected to phase modulation by a Zadoff-Chu sequence in the AAS according to the second example embodiment.
Figure 12:
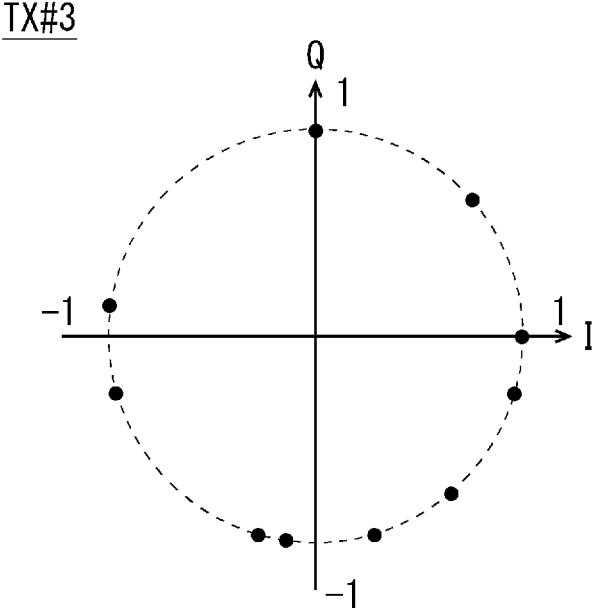
FIG. 12 is a diagram explaining an example of a constellation of a DL calibration signal subjected to phase modulation by a Zadoff-Chu sequence in the AAS according to the second example embodiment.
Figure 13:
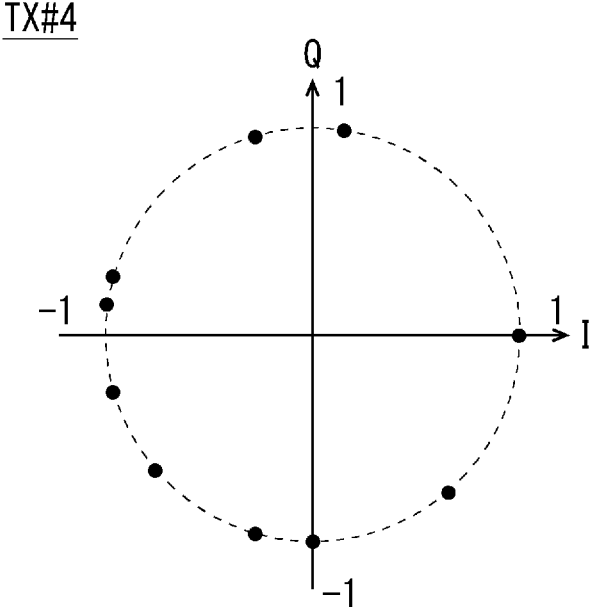
FIG. 13 is a diagram explaining an example of a constellation of a DL calibration signal subjected to phase modulation by a Zadoff-Chu sequence in the AAS according to the second example embodiment.
Figure 14:
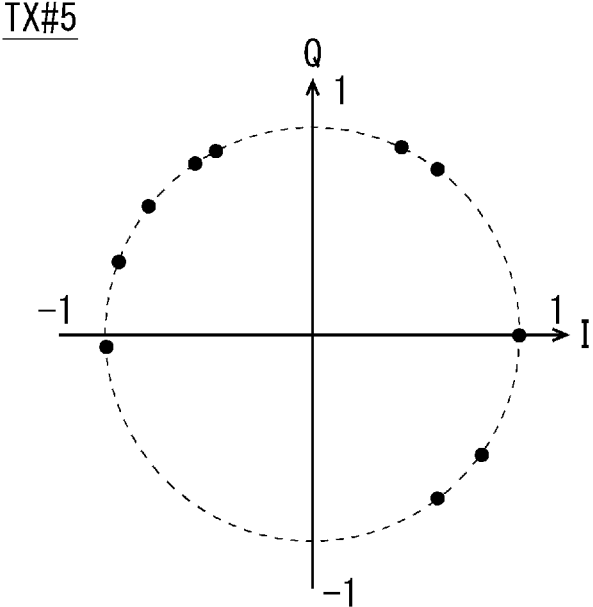
FIG. 14 is a diagram explaining an example of a constellation of a DL calibration signal subjected to phase modulation by a Zadoff-Chu sequence in the AAS according to the second example embodiment.
Figure 15:
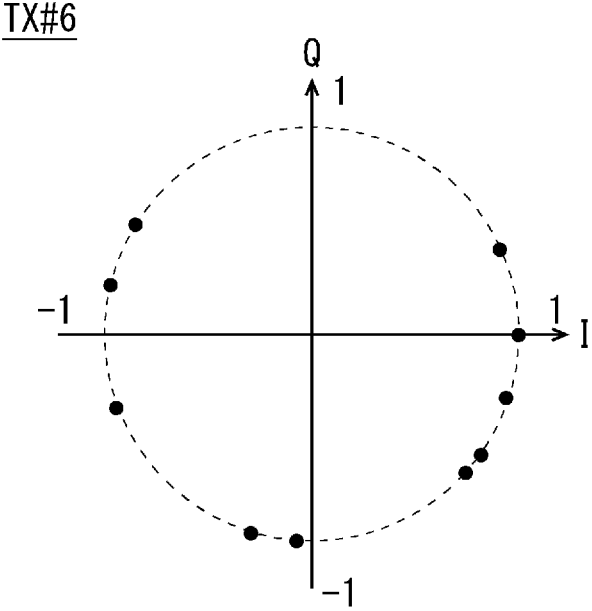
FIG. 15 is a diagram explaining an example of a constellation of a DL calibration signal subjected to phase modulation by a Zadoff-Chu sequence in the AAS according to the second example embodiment.
Figure 16:
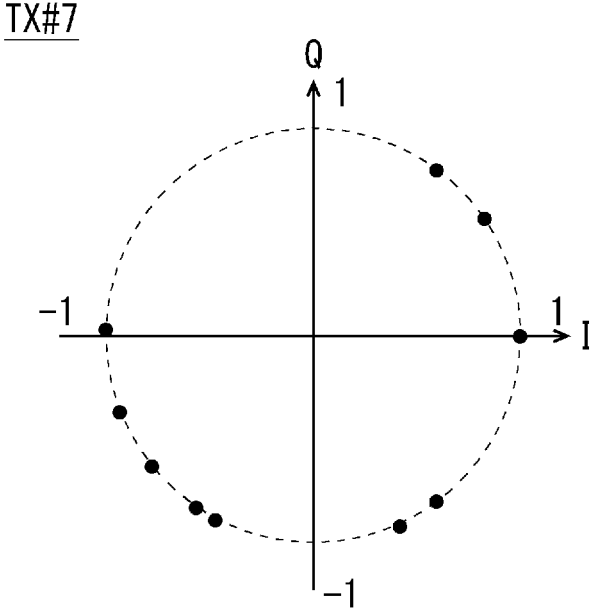
FIG. 16 is a diagram explaining an example of a constellation of a DL calibration signal subjected to phase modulation by a Zadoff-Chu sequence in the AAS according to the second example embodiment.
Figure 17:
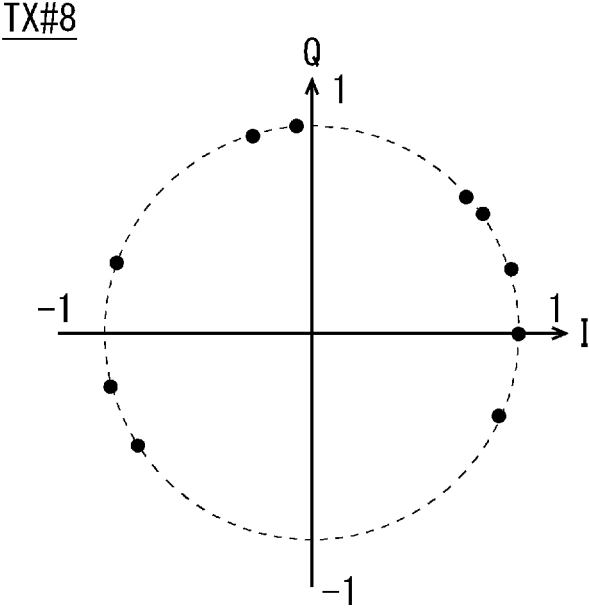
FIG. 17 is a diagram explaining an example of a constellation of a DL calibration signal subjected to phase modulation by a Zadoff-Chu sequence in the AAS according to the second example embodiment.
Figure 18:
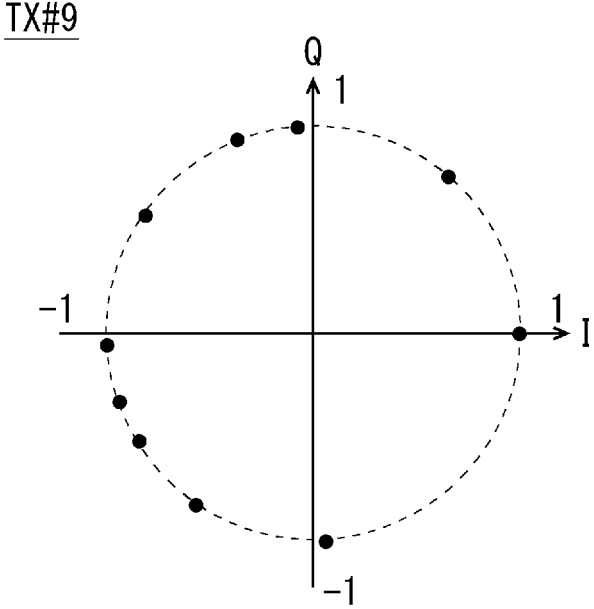
FIG. 18 is a diagram explaining an example of a constellation of a DL calibration signal subjected to phase modulation by a Zadoff-Chu sequence in the AAS according to the second example embodiment.
Figure 19:
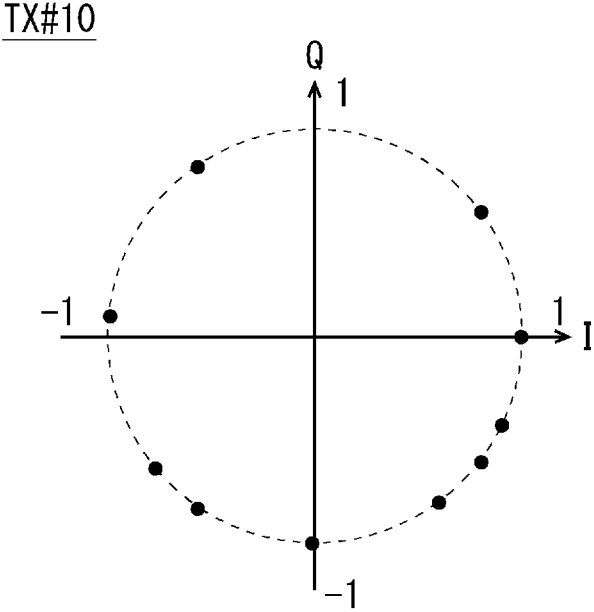
FIG. 19 is a diagram explaining an example of a constellation of a DL calibration signal subjected to phase modulation by a Zadoff-Chu sequence in the AAS according to the second example embodiment.
Figure 20:
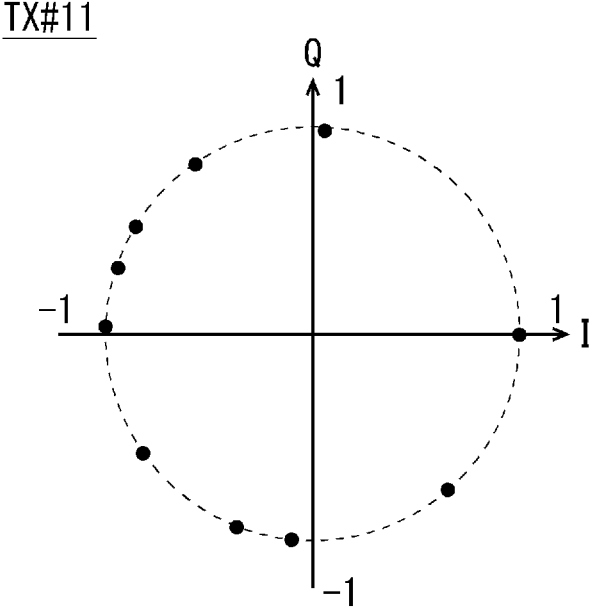
FIG. 20 is a diagram explaining an example of a constellation of a DL calibration signal subjected to phase modulation by a Zadoff-Chu sequence in the AAS according to the second example embodiment.
Figure 21:
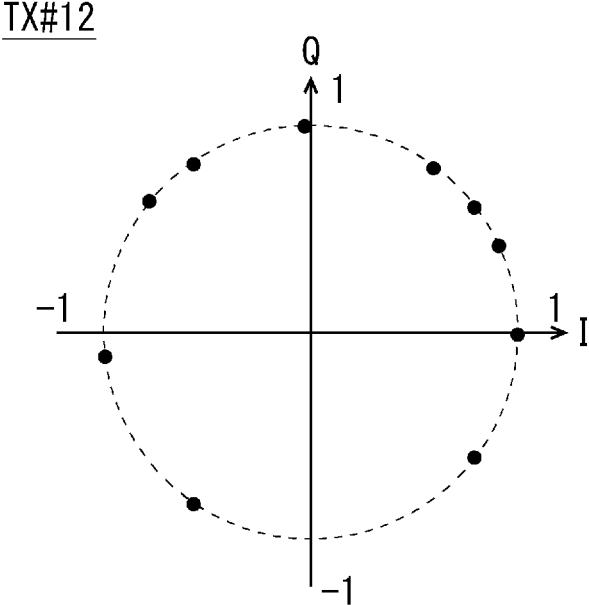
FIG. 21 is a diagram explaining an example of a constellation of a DL calibration signal subjected to phase modulation by a Zadoff-Chu sequence in the AAS according to the second example embodiment.
Figure 22:
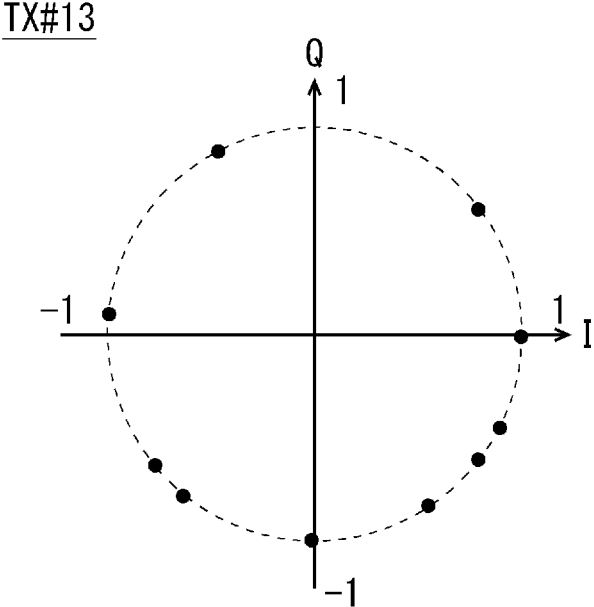
FIG. 22 is a diagram explaining an example of a constellation of a DL calibration signal subjected to phase modulation by a Zadoff-Chu sequence in the AAS according to the second example embodiment.
Figure 23:
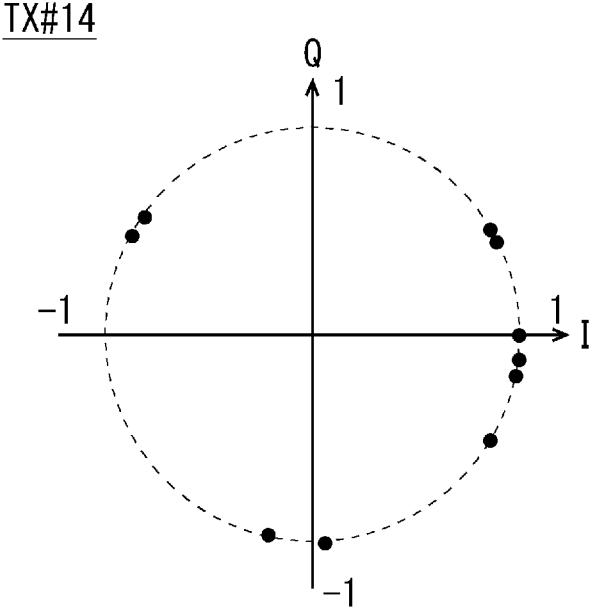
FIG. 23 is a diagram explaining an example of a constellation of a DL calibration signal subjected to phase modulation by a Zadoff-Chu sequence in the AAS according to the second example embodiment.
Figure 24:
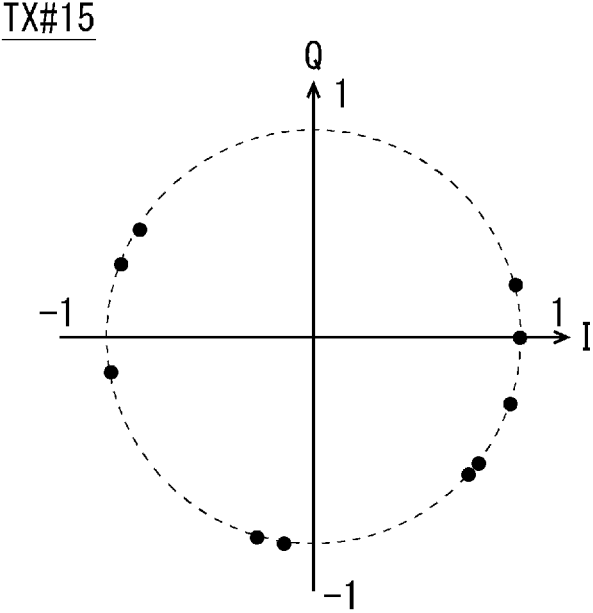
FIG. 24 is a diagram explaining an example of a constellation of a DL calibration signal subjected to phase modulation by a Zadoff-Chu sequence in the AAS according to the second example embodiment.
Figure 25:
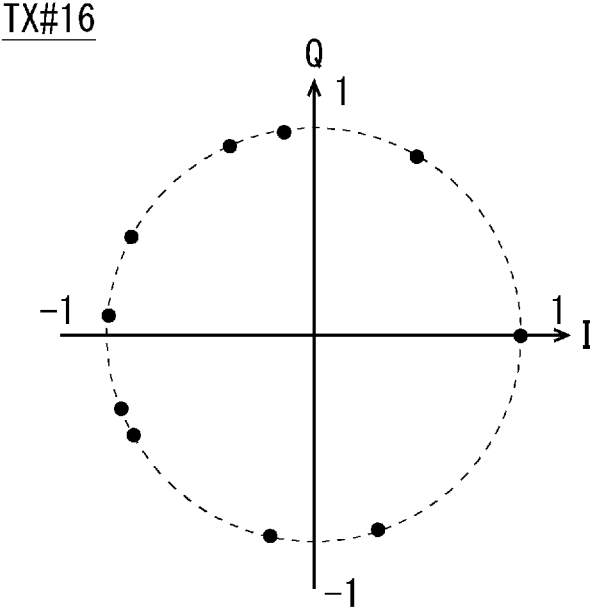
FIG. 25 is a diagram explaining an example of a constellation of a DL calibration signal subjected to phase modulation by a Zadoff-Chu sequence in the AAS according to the second example embodiment.

FIG. 9 is a diagram explaining a second example of the frequency arrangement of the DL calibration signal of each transmitter TX#n.

In the second example illustrated in FIG. 9, in the frequency arrangement of the DL calibration signal of one transmitter TX#n, subcarriers used for sending out the DL calibration signal are arranged at intervals of X [MHz]. This point is the same as the first example described above.

However, in the second example, in the adjacent transmitters TX#n, the frequency arrangements of the DL calibration signals are caused to shift by deviating by Y [MHz] or more in the frequency direction. For example, the frequency arrangement of the transmitter TX#2 is caused to shift in a positive frequency direction by fs1-fs0 (>Y) [MHz] with respect to the frequency arrangement of the transmitter TX#1. It is noted that fs0 [MHz] is a frequency serving as a reference of the transmitter TX#n in which n is an odd number, and fs1 [MHz] is a frequency serving as a reference of the transmitter TX#n in which n is an even number. Accordingly, the frequency arrangement of the transmitter TX#3 is caused to shift in a negative frequency direction by fs1−fs0−Y (>Y) [MHz] with respect to the frequency arrangement of the transmitter TX#2. Therefore, the frequency separation of the DL calibration signals between the transmitters TX#2 and TX#3 can be ensured.

In this manner, in the adjacent transmitters TX#n, the frequency arrangements of the DL calibration signals are caused to deviate and shift. As a result, in the baseband unit 20, a frequency separation degree at a time of frequency separation of a frequency-multiplexed DL calibration signal by the FFT is increased. This makes it possible to reduce the influence of mutual coupling between the adjacent transmitters TX#n/antennas 40#n even when the physical interval between the adjacent transmitters TX#n/antennas 40#n is narrow.

A shift amount of the frequency arrangement of the DL calibration signals between the adjacent transmitters TX#n may be optionally determined. For example, a shift amount which is not affected by mutual coupling may be acquired in advance, and the frequency arrangement may be caused to shift to the shift amount or more.

As described above, according to the first example embodiment, the baseband unit 20 causes the DL calibration signal sent from each transmitter TX#n to be orthogonalized in frequency for each transmitter TX#n. Therefore, even when the DL calibration signals are transmitted from the transmitters TX#n to the calibration transmitter-receiver CAL-TRX collectively and simultaneously, mixing and interference of the DL calibration signals on the frequency axis can be avoided.

This makes it possible to compensate for variations in amplitude and phase specifications of the transmitters TX#n and differences in amplitude and phase specifications that occur between the transmitters TX#n due to fluctuation in outside air temperature and temporal fluctuation during operation collectively in a short period of time, thereby maintaining high accuracy of DL calibration.

In addition, according to the first example embodiment, DL calibration of each transmitter TX#n can be performed collectively and simultaneously. Therefore, in order to perform DL calibration in a very short free time at the head or the tail of a UL symbol or a DL symbol under the 5G NR standard, it is effective to perform DL calibration of each transmitter TX#n collectively and simultaneously as in the first example embodiment.

Also, the spatial multiplexing performance (achievement of null depth, increase in the number of spatial multiplexing, etc.) when performing MU-MIMO depends greatly on the accuracy of DL calibration. Therefore, maintaining the accuracy of DL calibration as in the first example embodiment is effective in improving the spatial multiplexing performance when performing MU-MIMO.

Further, since the DL calibration according to the first example embodiment makes it possible not only to correct a variation in amplitude and phase characteristics of each transmitter TX#n but also to compensate an absolute value of output power of each transmitter TX#n, it is possible to further stabilize a transmission level of each transmitter TX#n. A method of stabilizing absolute values of output powers of all the transmitters TX#1 to TX#m using the DL calibration function described above can be achieved by performing weighting correction on an absolute output level of each of the transmitters TX#n in such a way as to match an absolute output level of the transmitter other than the representative transmitter to an absolute output level of the transmitter TX#1 as a representative transmitter. Alternatively, as another stabilization method, weighting correction can be performed on the absolute output level of each transmitter TX#n in such a way as to match the absolute output level of each transmitter TX#n to the average value of the absolute output levels of all the transmitters TX#1 to TX#m.

(2) Second Example Embodiment

In the first example embodiment described above, the baseband unit 20 causes the DL calibration signal sent from each transmitter TX#n to be orthogonalized in frequency for each transmitter TX#n. As a result, even when the DL calibration signals are transmitted from each transmitter TX#n to the calibration transmitter-receiver CAL-TRX collectively and simultaneously, mixing and interference between the DL calibration signals on the frequency axis can be avoided.

However, when the DL calibration signal passes through each transmitter TX#n or a calibration receiver CAL-RX, in a case where a peak to average power ratio (PAPR) of the DL calibration signal is high, the DL calibration signal may be affected by a nonlinearity of the transmitter TX#n or CAL-RX. As a result, the DL calibration signal may suffer distortion degradation due to AM-AM degradation to amplitude or AM-PM degradation to phase (where AM means amplitude modulation and PM means phase modulation). However, it is necessary to measure and learn linear variations of the amplitude and phase characteristics of the plurality of transmitters TX#n without distortion by the DL calibration signal, and to compensate for the same variation collectively. Therefore, it is required to maintain a linearity of the signal passing through the DL calibration path, and it is also necessary to avoid the problem of deterioration due to distortion at the time of passing through the same path.

Therefore, in the second example embodiment, in order to avoid the problem of deterioration due to the distortion described above, the baseband unit 20 applies phase modulation to the phase of each subcarrier used for sending out the DL calibration signal for each transmitter TX#n. The phase modulation may be, for example, phase modulation by a Zadoff-Chu (ZC) sequence, phase modulation by quadrature phase shift keying (QPSK), or quadrature amplitude modulation (QAM) in which phase modulation and amplitude modulation are combined may be used.

For example, in a case where 32 transmitter-receivers TRX#n are provided (i.e., in the case where m=32), it is assumed that each transmitter TX#n uses 10 subcarriers for sending out the DL calibration signal, and for each transmitter TX#n, phase modulation by a Zadoff-Chu sequence is applied to the phase of each of the 10 subcarriers. As an example of a constellation of DL calibration signals subjected to phase modulation by the Zadoff-Chu sequence, an example of a constellation of DL calibration signals for transmitters TX#1 to TX#16 are representatively illustrated in each of FIGS. 10 to 25.

Figure 26:
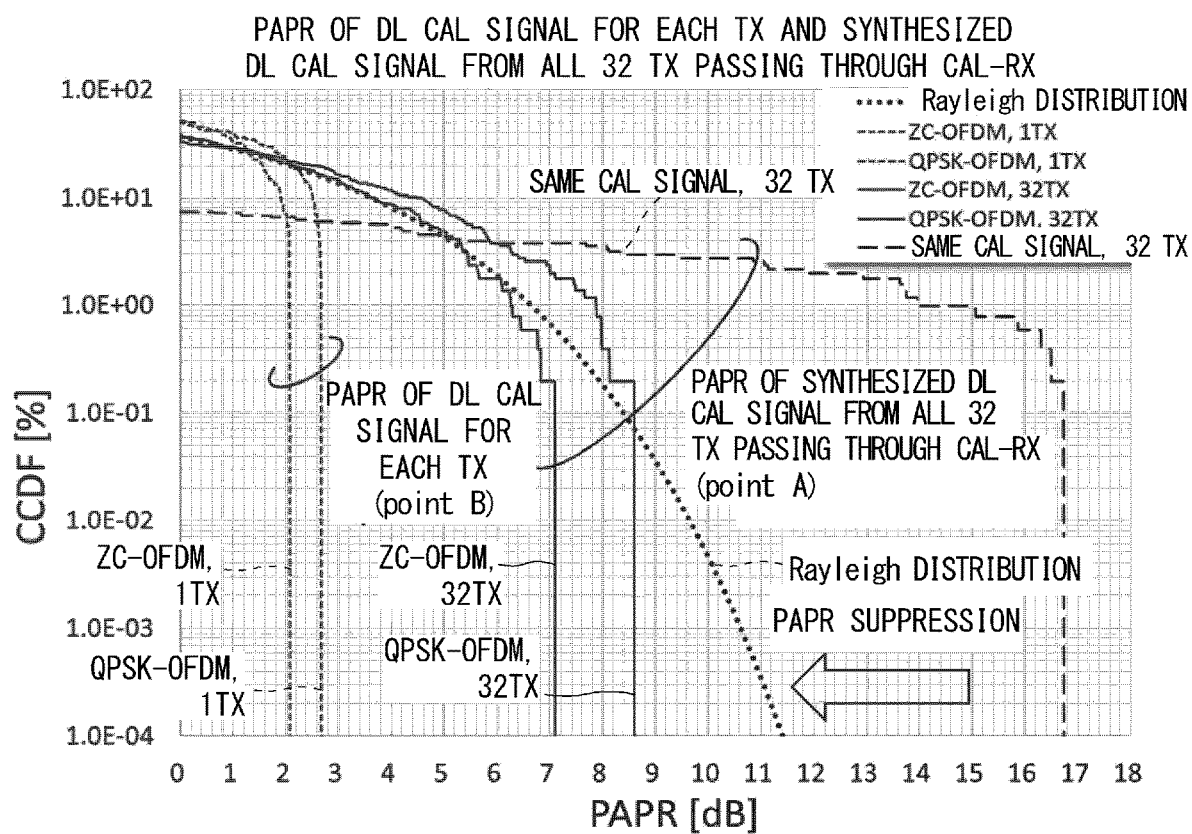
FIG. 26 is a diagram explaining an example of a PAPR characteristic of the DL calibration signal in the AAS according to the second example embodiment.

Next, with reference to FIG. 26, a PAPR characteristic of the DL calibration signal in the case where 32 transmitter-receivers TRX#n are provided (i.e., in the case where m=32) will be described. In FIG. 26, the horizontal axis represents PAPR [dB], and the vertical axis represents a complementary cumulative distribution function (CCDF) [%]. CCDF represents a probability that PAPR being the value on the horizontal axis occurs with respect to the DL calibration time signal.

In FIG. 26, PAPR characteristics of two types of DL calibration signals are illustrated as the PAPR characteristics of the DL calibration signals from one transmitter TX#n that have passed through the point B in FIG. 1. The first type is a PAPR characteristic of a DL calibration signal (denoted as "ZC-OFDM, 1TX" in the figure) subjected to phase modulation by a Zadoff-Chu sequence. The second type is a PAPR characteristic of a DL calibration signal (denoted as "QPSK-OFDM, 1TX" in the figure) subjected to phase modulation by QPSK.

As illustrated in FIG. 26, it can be seen that the PAPR of the DL calibration signal is suppressed by applying the phase modulation. In addition, it is understood that PAPR is suppressed in the DL calibration signal subjected to phase modulation by the Zadoff-Chu sequence, compared with the DL calibration signal subjected to phase modulation by QPSK.

In FIG. 26, PAPR characteristics of three kinds of synthesized signals are illustrated as PAPR characteristics of synthesized signals in which DL calibration signals from 32 transmitters TX#n passing through the point A in FIG. 1 are synthesized. The first type is a PAPR characteristic of a synthesized signal (denoted as "the same CAL signal, 32TX" in the figure) of the DL calibration signals from the 32 transmitters TX#n when the DL calibration signals are all arranged at the same frequency. The second type is a PAPR characteristic of a synthesized signal (denoted as "ZC-OFDM, 32TX" in the figure) of DL calibration signals from the 32 transmitters TX#n when the DL calibration signals are orthogonalized in frequency and subjected to phase modulation by a Zadoff-Chu sequence. The third type is a PAPR characteristic of a synthesized signal (denoted as "QPSK-OFDM, 32TX" in the figure) of the DL calibration signals from the 32 transmitters TX#n when the DL calibration signals are orthogonalized in frequency and subjected to phase modulation by QPSK.

As illustrated in FIG. 26, when the DL calibration signals from the 32 transmitters TX#n are all arranged at the same frequency, the PAPR of the synthesized signal is extremely increased. Therefore, in the baseband unit 20, before frequency separation of the synthesized signal is performed by FFT, thereby extracting the DL calibration signal for each transmitter TX#n, peak components of the synthesized time signal of the 32 DL calibration signals are overlapped with saturation characteristics of CAL-RX, which may cause AM-AM distortion and AM-PM distortion, resulting in distortion degradation of the DL calibration signal. In other words, since amplitude phase deterioration caused by the nonlinearity is superimposed on the amplitude phase characteristic of each transmitter TX#n which is originally a correction target, an erroneous calibration correction is applied to each transmitter TX#n. On the other hand, it is understood that PAPR is suppressed in the synthesized signal when the DL calibration signals from the 32 transmitters TX#n are subjected to phase modulation. Therefore, it is possible to acquire the amplitude and phase information of each transmitter TX#n that is an object for correction while maintaining the linearity of the DL calibration signal. It is also understood that the PAPR is suppressed in the synthesized signal of the DL calibration signals subjected to the phase modulation by the Zadoff-Chu sequence, compared to the synthesized signal of the DL calibration signals subjected to the phase modulation by the QPSK, similarly to the DL calibration signal passing through the point B. Accordingly, the DL calibration signal subjected to the phase modulation by the Zadoff-Chu sequence can reduce a distortion influence on the DL calibration signal more than the DL calibration signal subjected to the phase modulation by the QPSK.

As described above, according to the second example embodiment, the baseband unit 20 applies phase modulation to the phase of each subcarrier used by each transmitter TX#n for sending out the DL calibration signal for each transmitter TX#n.

As a result, since the PAPR of the DL calibration signal is suppressed, it is possible to avoid that the DL calibration signal is affected by the nonlinear distortion of the transmitter TX#n and erroneous DL calibration correction is performed.

(3) Concept of Example Embodiment

Figure 27:
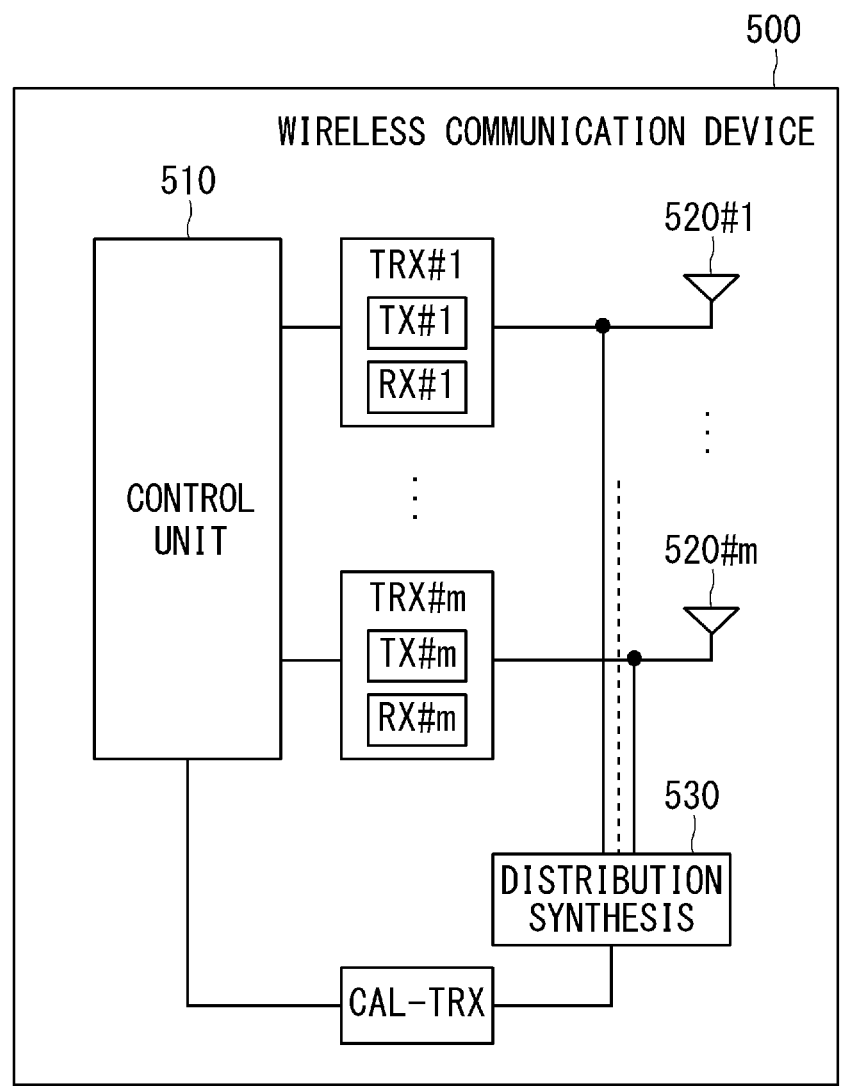
FIG. 27 is a diagram illustrating a configuration example of a wireless communication device conceptually illustrating an example embodiment.

Next, a configuration example of a wireless communication device 500 conceptually illustrating the AAS 100 according to the first and second example embodiments described above will be described with reference to FIG. 27. FIG. 27 is a diagram illustrating a configuration example of the wireless communication device 500 conceptually illustrating the first and second example embodiments described above.

As illustrated in FIG. 27, the wireless communication device 500 includes a control unit 510, a plurality (m which is a natural number of 2 or more) of transmitter-receivers TRX#n (n=1, . . . , m), a plurality (m) of antennas 520#n, a calibration transmitter-receiver CAL-TRX, and a distribution synthesis unit 530.

The transmitter-receiver TRX#n is associated to the transmitter-receiver TRX#n illustrated in FIG. 1. The transmitter-receiver TRX#n includes a transmitter TX#n and a receiver RX#n.

The control unit 510 is associated to the baseband unit 20 illustrated in FIG. 1, and performs control related to transmission calibration (DL calibration). More specifically, the control unit 510 causes the transmission calibration signal to be sent to each transmitter TX#n to be orthogonalized in frequency for each transmitter TX#n.

At this time, the control unit 510 may arrange the frequency arrangement of the transmission calibration signal of each transmitter TX#n by arranging subcarriers used for sending out the transmission calibration signal at predetermined intervals. The control unit 510 may cause the frequency arrangement of the transmission calibration signal of a transmitter (transmitter TX#n−1 or transmitter TX#n+1) adjacent to one transmitter TX#n to shift in a frequency direction from the frequency arrangement of the transmission calibration signal of the one transmitter TX#n. The control unit 510 may cause the frequency arrangement of the transmission calibration signal of the transmitter (transmitter TX#n−1 or transmitter TX#n+1) adjacent to one transmitter TX#n to shift by a predetermined shift amount or more in the frequency direction from the frequency arrangement of the transmission calibration signal of the transmitter TX#n.

Each transmitter TX#n sends a transmission calibration signal that is orthogonalized in frequency. It is noted that each transmitter TX#n may simultaneously send transmission calibration signals that are orthogonalized in frequency.

The distribution synthesis unit 530 is associated to the distribution synthesis unit 60 illustrated in FIG. 1. The distribution synthesis unit 530 synthesizes the transmission calibration signals transmitted from the transmitters TX#n, and transmits the synthesized signal to the calibration receiver CAL-RX in the calibration transmitter-receiver CAL-TRX.

The calibration transmitter-receiver CAL-TRX is associated to the calibration transmitter-receiver CAL-TRX illustrated in FIG. 1. The calibration receiver CAL-RX sends the synthesized signal transmitted from the distribution synthesis unit 530 to the control unit 510.

The control unit 510 calculates a transmission calibration weight for compensating for variations in amplitude and phase characteristics of each transmitter TX#n, based on the synthesized signal sent from the calibration transmitter-receiver CAL-TRX.

In addition, the control unit 510 may apply phase modulation to the phase of the subcarrier used by each transmitter TX#n for sending out the transmission calibration signal for each transmitter TX#n.

At this time, the phase modulation may be a phase modulation by a Zadoff-Chu sequence, a phase modulation by QPSK, or an amplitude phase modulation by QAM.

Although the present disclosure has been described above with reference to the example embodiments, the present disclosure is not limited to the example embodiments described above. Various modifications may be made to the structure and details of the present disclosure as will be understood by those skilled in the art within the scope of the present disclosure.

For example, in the example embodiment described above, the configuration in which 32 transmitter-receivers are provided has been described as an example, but the number of transmitter-receivers is not limited to 32. The number of transmitter-receivers may be greater than 32 or less than 32.

In the above example embodiment, an example in which the AAS according to the present disclosure is used for a base station has been described, but the present disclosure is not limited thereto. The AAS according to the present disclosure can be used for optional wireless communication device other than a base station.

In the above example embodiment, the AAS according to the present disclosure has been described as a hardware configuration, but the present disclosure is not limited thereto. According to the present disclosure, optional processing of the ASS can also be achieved by causing a processor such as a central processing unit (CPU) to execute a computer program.

In the above examples, the program may be stored and provided to a computer by using various types of non-transitory computer readable media. Non-transitory computer readable media include various types of tangible storage media. Examples of the non-transitory computer readable media include magnetic recording media (e.g., flexible disk, magnetic tape, hard disk drive), magneto-optical recording media (e.g., magneto-optical disk), compact disc-read only memory (CD-ROM), CD-recordable (CD-R), CD-rewritable (CD-R/W), semiconductor memory (e.g., mask ROM, programmable ROM (PROM), erasable PROM (EPROM), flash ROM, and random access memory (RAM)). The program may also be supplied to a computer by various types of transitory computer readable media. Examples of the transitory computer-readable media include electrical signals, optical signals, and electromagnetic waves. The transitory computer-readable media are able to provide the program to the computer via wired communication paths, such as electrical wires and optical fibers, or wireless communication paths.

In addition, some or all of the above-mentioned example embodiments may be described as the following appendix, but the present invention is not limited to the following.

(Supplementary Note 1)

A wireless communication device comprising:
  a plurality of antennas;
  a plurality of transmitter-receivers that are provided in association with each of the plurality of antennas, and each include a transmitter and a receiver;
  a calibration transmitter-receiver;
  a distribution synthesis unit; and
  a control unit, wherein
  the control unit causes a transmission calibration signal to be sent to each transmitter to be orthogonalized in frequency for each transmitter,
  each transmitter sends the transmission calibration signal being orthogonalized in frequency, and
  the distribution synthesis unit synthesizes the transmission calibration signals being sent from transmitters and transmits the synthesized signal to the calibration transmitter-receiver.

(Supplementary Note 2)

The wireless communication device according to Supplementary Note 1, wherein the control unit arranges a frequency arrangement of the transmission calibration signal of each transmitter by arranging subcarriers being used by each transmitter for sending out the transmission calibration signal at predetermined intervals, and causes a frequency arrangement of the transmission calibration signal of a transmitter adjacent to one transmitter to shift in a frequency direction from a frequency arrangement of the transmission calibration signal of the one transmitter.

(Supplementary Note 3)

The wireless communication device according to Supplementary Note 2, wherein the control unit causes a frequency arrangement of the transmission calibration signal of a transmitter adjacent to the one transmitter to shift in a frequency direction from a frequency arrangement of the transmission calibration signal of the one transmitter by a predetermined shift amount or more.

(Supplementary Note 4)

The wireless communication device according to any one of Supplementary Notes 1 to 3, wherein the control unit applies phase modulation to a phase of a subcarrier being used by each transmitter for sending out the transmission calibration signal, for each transmitter.

(Supplementary Note 5)

The wireless communication device according to Supplementary Note 4, wherein the phase modulation is phase modulation by a Zadoff-Chu sequence, phase modulation by quadrature phase shift keying (QPSK), or amplitude-phase modulation by quadrature amplitude modulation (QAM).

(Supplementary Note 6)

A wireless communication method by a wireless communication device provided with a plurality of antennas, a plurality of transmitter-receivers that are provided in association with each of the plurality of antennas, and each include a transmitter and a receiver, a calibration transmitter-receiver, and a distribution synthesis unit, the wireless communication method comprising:
  a first step of causing a transmission calibration signal to be sent to each transmitter to be orthogonalized in frequency for each transmitter;
  a second step of causing each transmitter to send the transmission calibration signal being orthogonalized in frequency; and
  a third step of causing the distribution synthesis unit to synthesize the transmission calibration signals being sent from transmitters and transmit the synthesized signal to the calibration transmitter-receiver.

(Supplementary Note 7)

The wireless communication method according to Supplementary Note 6, wherein, in the first step, a frequency arrangement of the transmission calibration signal of each transmitter is a frequency arrangement in which subcarriers being used by each transmitter for sending out the transmission calibration signal are arranged at predetermined intervals, and a frequency arrangement of the transmission calibration signal of a transmitter adjacent to one transmitter is caused to shift in a frequency direction from a frequency arrangement of the transmission calibration signal of the one transmitter.

(Supplementary Note 8)

The wireless communication method according to Supplementary Note 7, wherein, in the first step, a frequency arrangement of the transmission calibration signal of a transmitter adjacent to the one transmitter is caused to shift in a frequency direction from a frequency arrangement of the transmission calibration signal of the one transmitter by a predetermined shift amount or more.

(Supplementary Note 9)

The wireless communication method according to any one of Supplementary Notes 6 to 8, further comprising a fourth step of applying phase modulation to a phase of a subcarrier being used by each transmitter for sending out the transmission calibration signal, for each transmitter.

(Supplementary Note 10)

The wireless communication method according to Supplementary Note 9, wherein the phase modulation is phase modulation by a Zadoff-Chu sequence, phase modulation by quadrature phase shift keying (QPSK), or amplitude-phase modulation by quadrature amplitude modulation (QAM).

This application is based upon and claims the benefit of priority from Japanese patent application No. 2019-141082, filed on Jul. 31, 2019, the disclosure of which is incorporated herein in its entirety by reference.

REFERENCE SIGNS LIST

10 Optical transceiver
20 Baseband unit
30 Frontend unit
TRX#n Transmitter-receiver
31#n Switch
32#n Transmission amplifier
33#n Reception amplifier
40#n Antenna
CAL-TRX Calibration transmitter-receiver
50 Switch
60 Distribution synthesis unit
61 Distribution synthesizer
100 AAS
500 Wireless communication device
510 Control unit
520#n Antenna
530 Distribution synthesis unit
900 Distribution unit

What is claimed is:

1. A wireless communication device comprising:
a plurality of antennas;
a plurality of transmitter-receivers that are provided in association with each of the plurality of antennas, and that each include a transmitter and a receiver;
a calibration transmitter-receiver;
a distribution synthesis unit; and
a control unit, wherein
the control unit causes a transmission calibration signal to be sent to each transmitter to be orthogonalized in frequency for each transmitter,
each transmitter sends the transmission calibration signal being orthogonalized in frequency,
the distribution synthesis unit synthesizes the transmission calibration signals being sent from the transmitters and transmits the synthesized signal to the calibration transmitter-receiver, and
the control unit applies phase modulation to a phase of a subcarrier being used by each transmitter for sending out the transmission calibration signal, for each transmitter.

2. The wireless communication device according to claim 1, wherein the control unit arranges a frequency arrangement of the transmission calibration signal of each transmitter by arranging the subcarrier being used by each transmitter for sending out the transmission calibration signal at predetermined intervals, and causes a frequency arrangement of the transmission calibration signal of a first transmitter adjacent to a second transmitter to shift in a frequency direction from a frequency arrangement of the transmission calibration signal of the second transmitter.

3. The wireless communication device according to claim 2, wherein the control unit causes the frequency arrangement of the transmission calibration signal of the first transmitter adjacent to the second transmitter to shift in the frequency direction from the frequency arrangement of the transmission calibration signal of the second transmitter by a predetermined shift amount or more.

4. The wireless communication device according to claim 1, wherein the phase modulation is phase modulation by a Zadoff-Chu sequence, phase modulation by quadrature phase shift keying (QPSK), or amplitude-phase modulation by quadrature amplitude modulation (QAM).

5. A wireless communication method performed by a wireless communication device including a plurality of antennas; a plurality of transmitter-receivers that are provided in association with each of the plurality of antennas, and that each include a transmitter and a receiver; a calibration transmitter-receiver; and a distribution synthesis unit, the wireless communication method comprising:
causing a transmission calibration signal to be sent to each transmitter to be orthogonalized in frequency for each transmitter;
causing each transmitter to send the transmission calibration signal being orthogonalized in frequency;
causing the distribution synthesis unit to synthesize the transmission calibration signals being sent from transmitters and transmit the synthesized signal to the calibration transmitter-receiver; and
applying phase modulation to a phase of a subcarrier being used by each transmitter for sending out the transmission calibration signal, for each transmitter.

6. The wireless communication method according to claim 5, wherein a frequency arrangement of the transmission calibration signal of each transmitter is a frequency arrangement in which the subcarrier being used by each transmitter for sending out the transmission calibration signal are arranged at predetermined intervals, and a frequency arrangement of the transmission calibration signal of a first transmitter adjacent to a second transmitter is caused to shift in a frequency direction from a frequency arrangement of the transmission calibration signal of the second transmitter.

7. The wireless communication method according to claim 6, wherein the frequency arrangement of the transmission calibration signal of the first transmitter adjacent to the second transmitter is caused to shift in the frequency direction from the frequency arrangement of the transmission calibration signal of the second transmitter by a predetermined shift amount or more.

8. The wireless communication method according to claim 6, wherein the phase modulation is phase modulation by a Zadoff-Chu sequence, phase modulation by quadrature phase shift keying (QPSK), or amplitude-phase modulation by quadrature amplitude modulation (QAM).

9. A wireless communication device comprising:
- a plurality of antennas;
- a plurality of transmitter-receivers that are provided in association with each of the plurality of antennas, and that each include a transmitter and a receiver;
- a calibration transmitter-receiver;
- a distribution synthesis unit; and
- a control unit, wherein
- the control unit causes a transmission calibration signal to be sent to each transmitter to be orthogonalized in frequency for each transmitter,
- each transmitter sends the transmission calibration signal being orthogonalized in frequency,
- the distribution synthesis unit synthesizes the transmission calibration signals being sent from the transmitters and transmits the synthesized signal to the calibration transmitter-receiver, and
- the control unit arranges a frequency arrangement of the transmission calibration signal of each transmitter by arranging the subcarrier being used by each transmitter for sending out the transmission calibration signal at predetermined intervals, and causes a frequency arrangement of the transmission calibration signal of a first transmitter adjacent to a second transmitter to shift in a frequency direction from a frequency arrangement of the transmission calibration signal of the second transmitter.

10. The wireless communication device according to claim 9, wherein the control unit causes the frequency arrangement of the transmission calibration signal of the first transmitter adjacent to the second transmitter to shift in the frequency direction from the frequency arrangement of the transmission calibration signal of the second transmitter by a predetermined shift amount or more.

\* \* \* \* \*